(12) United States Patent
Xu et al.

(10) Patent No.: US 11,082,166 B2
(45) Date of Patent: Aug. 3, 2021

(54) DATA RETRANSMISSION METHOD AND COMMUNICATIONS APPARATUS

(71) Applicant: HUAWEI TECHNOLOGIES CO., LTD., Shenzhen (CN)

(72) Inventors: Xiuqiang Xu, Shanghai (CN); Yiqun Wu, Shanghai (CN); Yan Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/523,941

(22) Filed: Jul. 26, 2019

(65) Prior Publication Data

US 2019/0349135 A1 Nov. 14, 2019

Related U.S. Application Data

(63) Continuation of application No. PCT/CN2018/073855, filed on Jan. 23, 2018.

(30) Foreign Application Priority Data

Jan. 26, 2017 (CN) .......................... 201710061846.X

(51) Int. Cl.
*H04L 1/18* (2006.01)
(52) U.S. Cl.
CPC ............ *H04L 1/188* (2013.01); *H04L 1/1812* (2013.01); *H04L 1/1887* (2013.01)

(58) Field of Classification Search
CPC ...... H04L 1/188; H04L 1/1812; H04L 1/1887
See application file for complete search history.

(56) References Cited

U.S. PATENT DOCUMENTS

| 6,519,223 | B1 | 2/2003 | Wager et al. |
| 2005/0005207 | A1 | 1/2005 | Herneque |
| 2005/0276266 | A1* | 12/2005 | Terry ...................... H04L 12/28 |

(Continued)

FOREIGN PATENT DOCUMENTS

| CN | 1354930 A | 6/2002 |
| CN | 1561615 A | 1/2005 |

(Continued)

*Primary Examiner* — Ronald B Abelson
(74) *Attorney, Agent, or Firm* — Hauptman Ham, LLP

(57) ABSTRACT

Embodiments provide a data retransmission method and a communications apparatus. The method includes: starting, by a transmit end, a timer before transmitting new data to a receive end, where a preset value of the timer is a maximum transmission latency corresponding to a service type of the data; retransmitting, by the transmit end, the data to the receive end when data needs to be retransmitted; transmitting, by the transmit end, the data to the receive end; and stopping sending, by the transmit end, retransmission data to the receive end when the timer expires, where the retransmission data is a part or all of the data. In this way, the following prior-art problem is avoided: Because a maximum retransmission quantity is not exhausted but a maximum transmission latency is exhausted, the transmit end still sends data, and consequently the receive end receives expiration data. This can avoid redundant transmission and save transmission resources.

14 Claims, 11 Drawing Sheets

(56) References Cited

U.S. PATENT DOCUMENTS

| | | | |
|---|---|---|---|
| 2007/0171857 A1* | 7/2007 | Wang | H04L 12/56 |
| 2007/0268861 A1 | 11/2007 | Diachina et al. | |
| 2008/0209297 A1 | 8/2008 | Chandra et al. | |
| 2009/0238124 A1* | 9/2009 | Pragada | H04W 72/04 |
| 2010/0074122 A1* | 3/2010 | Nakano | H04J 3/14 |
| 2011/0134829 A1 | 6/2011 | Chen et al. | |

FOREIGN PATENT DOCUMENTS

| | | | | |
|---|---|---|---|---|
| CN | 101277174 A | | 10/2008 | |
| CN | 2056540 | * | 5/2009 | H04L 12/56 |
| CN | 101444033 A | | 5/2009 | |
| CN | 101686196 A | | 3/2010 | |
| CN | 102548011 A | | 7/2012 | |
| CN | 105939184 A | | 9/2016 | |
| CN | 105850068 B | | 5/2019 | |
| EP | 1166486 A1 | | 1/2002 | |
| WO | 2008097003 A1 | | 8/2008 | |

* cited by examiner

DATA RETRANSMISSION METHOD AND COMMUNICATIONS APPARATUS

CROSS-REFERENCE TO RELATED APPLICATIONS

This application is a continuation of International Application No. PCT/CN2018/073855, filed on Jan. 23, 2018, which claims priority to Chinese Patent Application No. 201710061846.X, filed on Jan. 26, 2017. The disclosures of the aforementioned applications are hereby incorporated by reference in their entireties.

TECHNICAL FIELD

This application relates to the field of wireless communications technologies, and in particular, to a data retransmission method and a communications apparatus.

BACKGROUND

An ultra-reliable and low-latency communications (Ultra-Reliability Low-Latency Communication, URLLC) scenario is an important scenario in a future communications network. Typical features of the scenario are high reliability (for example, reliability is up to 99.999%) and a low transmission latency (for example, latencies of some services are less than 1 ms).

Data retransmission such as hybrid automatic repeat request (Hybrid Auto ReQuest, HARQ) is an important means of improving transmission reliability. Therefore, for communication in the URLLC scenario, a retransmission technology is very likely introduced to meet a reliability requirement, and includes a feedback-based retransmission technology and a non-feedback-based retransmission technology.

The feedback-based retransmission technology is as follows: After sending data, a transmit end waits for a receive end to feed back a receiving status of the data. If the transmit end receives a negative feedback such as a NACK (Negative Acknowledgment) from the receive end, or the transmit end does not receive a positive feedback such as an ACK (Acknowledge) from the receive end, the transmit end retransmits the data. The retransmission may be a complete replication of a previous time of transmission, or may be a different redundancy version.

The non-feedback-based retransmission technology is as follows: After sending data, a transmit end does not need to wait for a receive end to feed back a receiving status of the data, but directly retransmits the data on a possible subsequent sending occasion such as a slot or a subframe. The retransmission may be a complete replication of a previous time of transmission, or may be a different redundancy version. In addition, it should be noted that retransmission necessarily increases a latency. Therefore, to meet a low-latency requirement, retransmission cannot be performed unlimitedly. Instead, retransmission needs to be performed for specific times within an allowable latency.

In an LTE system, a transmit end determines only a retransmission quantity before performing retransmission. If a maximum retransmission quantity is not reached, the transmit end performs retransmission; or if the maximum retransmission quantity is reached, the transmit end does not perform retransmission.

The inventor finds that expiration data and redundant transmission are easily caused in a prior-art retransmission manner. This has a negative impact on a communications system and cannot meet a low-latency requirement.

SUMMARY

This application describes a data retransmission method, a communications apparatus, and a system.

To resolve a prior-art problem that expiration data and redundant transmission are easily caused during data retransmission, this application provides a data retransmission method.

According to an aspect, an embodiment provides a technical solution for determining a latency when data is to be sent. To be specific, a transmit end starts a timer before sending the data, and this step includes that the transmit end starts the timer when obtaining new to-be-sent data, or starts the timer when new data reaches the transmit end. After the transmit end starts the timer, each time before data is sent (including the first time of transmission and retransmission) or before retransmission data needs to be sent, the transmit end determines whether the timer has a remaining time. If the timer has no remaining time or the remaining time is insufficient for one time of data transmission, the transmit end stops sending the data. In this way, the following prior-art problem is avoided: Because a maximum retransmission quantity is not exhausted but a maximum transmission latency is exhausted, the transmit end still sends data, and consequently a receive end receives expiration data. This can avoid redundant transmission and save transmission resources.

According to another aspect, a maximum transmission latency corresponding to transmission data varies with a service type of the transmission data. Therefore, in this embodiment, a maximum transmission quantity is determined based on the maximum transmission latency. After obtaining new data, the transmit end performs transmission for the first time and retransmission based on the maximum transmission quantity, instead of performing retransmission based on a same maximum retransmission quantity specified by a system.

The data retransmission method provided in this embodiment includes:

determining, by the transmit end, a maximum transmission quantity of new to-be-sent data, where the maximum transmission quantity is determined based on a maximum transmission latency and a single transmission latency, and the maximum transmission latency depends on a service type corresponding to the data; and when data needs to be retransmitted, sending, by the transmit end, retransmission data based on the maximum transmission quantity, where the retransmission data is a part or all of the data.

The maximum transmission quantity includes the first time when the new data is sent and a retransmission quantity for sending the retransmission data.

In an implementation, the determining, by the transmit end, a maximum transmission quantity for sending data includes:

determining, by the transmit end based on a system configuration, the maximum transmission latency, and the single transmission latency, the maximum transmission quantity for sending data; or determining, by the transmit end, the maximum transmission quantity from an indication message from the receive end, where the maximum transmission quantity is determined by the receive end based on a system configuration, the maximum transmission latency, and the single transmission latency.

The system configuration indicates whether a configured transmission resource is consecutive or inconsecutive, or indicates a value of a time interval between configured transmission resources, for example, a value of T_Gap.

In another implementation, the transmitting, by the transmit end, the data to the receive end based on the maximum transmission quantity includes:

starting, by the transmit end, a timer before sending the data, where a preset value of the timer is the maximum transmission latency corresponding to the service type of the data;

decreasing, by the transmit end, the maximum transmission quantity by 1 each time the transmit end sends data to the receive end (including the first time of data transmission); and stopping sending, by the transmit end, the retransmission data to the receive end when the timer expires or the maximum transmission quantity is 0.

The starting, by the transmit end, a timer before sending the data includes: starting, by the transmit end, the timer before obtaining new to-be-sent data, or starting the timer when new data reaches the transmit end.

In still another implementation, the transmitting, by the transmit end, the data to the receive end based on the maximum transmission quantity includes:

starting, by the transmit end, a timer before sending the data, where a preset value of the timer is the maximum transmission latency corresponding to the service type of the data;

decreasing, by the transmit end, the maximum transmission quantity by 1 each time the transmit end sends data to the receive end (including the first time of data transmission); and stopping sending, by the transmit end, the retransmission data to the receive end when the timer does not expire and the maximum transmission quantity is not 0 and if a remaining time of the timer is less than a time required by the receive end to receive and process the retransmission data.

In yet another implementation, the transmitting, by the transmit end, the data to the receive end based on the maximum transmission quantity includes:

starting, by the transmit end, a timer before sending the data, where a preset value of the timer is the maximum transmission latency corresponding to the service type of the data;

decreasing, by the transmit end, the maximum transmission quantity by 1 each time the transmit end sends data to the receive end (including the first time of data transmission); and sending, by the transmit end, the retransmission data to the receive end when the timer does not expire and the maximum transmission quantity is not 0 and if a remaining time of the timer is greater than or equal to a time required by the receive end to receive and process the retransmission data.

In the foregoing several implementations, when the transmit end sends the data by using an uplink transmission time-frequency resource that is prestored by the transmit end and that is allocated by the receive end to the transmit end, a manner of calculating the maximum transmission quantity is as follows:

$N\_MAX=Floor(Total\_Delay\_MAX/Single\_Tx\_Delay)$, where

Floor ( ) means rounding down;

Total_Delay_MAX represents the maximum transmission latency corresponding to the service type of the data; and Single_Tx_Delay represents the single transmission latency corresponding to the service type of the data.

In the foregoing several implementations, when the transmit end requests the receive end to schedule an uplink transmission time-frequency resource to send the data, a manner of calculating the maximum transmission quantity is as follows:

$N\_MAX=Floor((Total\_Delay\_MAX-Delta\_T)/Single\_Tx\_Delay)$, where

Floor ( ) means rounding down;

Total_Delay_MAX represents the maximum transmission latency corresponding to the service type of the data;

Delta_T represents a latency for requesting to schedule the resource;

and

Single_Tx_Delay represents the single transmission latency corresponding to the service type of the data.

In the foregoing several implementations, $Single\_Tx\_Delay \in [(T\_Tx+T\_AI+T\_Rx+T\_Bu), (T\_Gap+T\_Tx+T\_AI+T\_Rx+T\_Bu)]$, where $T\_Gap \geq 0$ ms represents a time interval between two adjacent transmission resources for sending uplink data, $T\_Tx>0$ ms represents a latency required by the transmit end to process data, $T\_Rx>0$ ms represents a latency required by the receive end to process received data, $T\_Rx>0$ ms represents a latency required to transmit data through an air interface, and $T\_Bu>0$ ms represents a latency required when data at the transmit end waits to be sent in a buffer.

In the foregoing several implementations, $Delta\_T \in [(T\_AI\_SR+T\_Gap\_SR\_D), (T\_Gap\_SR+T\_AI\_SR+T\_Gap\_SR\_D)]$, where $T\_Gap\_SR \geq 0$ ms represents a time interval between two adjacent transmission resources for sending scheduling requests;

$T\_AI\_SR>0$ ms represents a latency required by the transmit end to send a scheduling request through an air interface; and $T\_Gap\_SR\_D \geq 0$ ms represents a time interval between a moment at which the transmit end sends the scheduling request and a moment at which the receive end allocates, to the transmit end, a transmission resource for sending uplink data.

In the data retransmission method provided in this embodiment, the maximum transmission latency is set, so that redundant transmission caused because data related to all services needs to be retransmitted for same times can be avoided, and information exchange between transmit ends is reduced, thereby reducing operation processing complexity of retransmission and reducing a retransmission feedback time.

According to still another aspect, a dual determining mechanism may also be used. To be specific, in this application, data is transmitted by jointly determining whether the maximum transmission quantity is exhausted and determining whether the maximum transmission latency is exhausted. When either the maximum transmission latency is exhausted or the maximum transmission quantity is exhausted, the transmit end stops transmitting data to the receive end, to avoid redundant transmission and invalid retransmission, so that data transmission efficiency is higher.

For an uplink grant free transmission scenario and an uplink granted transmission scenario, a plurality of manners for calculating the single transmission latency are further provided in this application, so that maximum transmission quantities in different scenarios can be accurately calculated, and the technical solutions in this application can meet requirements in different scenarios and meet a URLLC requirement.

According to another aspect, an embodiment provides a communications apparatus. The communications apparatus may be a network side device or a terminal. The network side device may be a base station or a control node. When the network side device is used as a data transmit end, the terminal is used as a data receive end; or when the terminal is used as the data transmit end, the network side device is used as the data receive end.

In an implementation, the communications apparatus is used as a data transmit end and includes:

a processor, configured to: start a timer before a transceiver transmits new data to a receive end, or start, by the processor, the timer when the transceiver obtains the new data, where a preset value of the timer is a maximum transmission latency corresponding to a service type of the data; and the transceiver, configured to transmit the data to the receive end after the processor starts the timer, where the processor is further configured to determine whether the timer expires; and the transceiver sends retransmission data to the receive end when the timer does not expire and data needs to be retransmitted, where the retransmission data is a part or all of the data; or the transceiver stops sending the retransmission data to the receive end when the timer expires.

After the communications apparatus provided in this embodiment is implemented, the following prior-art problem is avoided: Because a maximum retransmission quantity is not exhausted but a maximum transmission latency is exhausted, the transmit end still sends data, and consequently the receive end receives expiration data. This can avoid redundant transmission and save transmission resources.

In another implementation, the communications apparatus is used as a data transmit end and includes:

a processor, configured to determine a maximum transmission quantity of new to-be-sent data, where the maximum transmission quantity is determined based on a maximum transmission latency and a single transmission latency, and the maximum transmission latency depends on a service type corresponding to the data; and a transceiver, configured to: when data needs to be retransmitted, send retransmission data based on the maximum transmission quantity, where the retransmission data is a part or all of the data.

The maximum transmission quantity includes the first time when the new data is sent and a retransmission quantity for sending the retransmission data.

In an implementation, the processor is specifically configured to determine, based on a system configuration, the maximum transmission latency, and the single transmission latency, the maximum transmission quantity for sending data; or the processor is configured to determine the maximum transmission quantity from an indication message from the receive end, where the maximum transmission quantity is determined by the receive end based on a system configuration, the maximum transmission latency, and the single transmission latency.

The system configuration indicates whether a configured transmission resource is consecutive or inconsecutive, or indicates a value of a time interval between configured transmission resources, for example, a value of T_Gap.

In another implementation, the processor is configured to start a timer before the data is sent, where a preset value of the timer is the maximum transmission latency corresponding to the service type of the data;

the processor decreases the maximum transmission quantity by 1 each time the transceiver sends data to the receive end (including the first time of data transmission); and the transceiver stops sending the retransmission data to the receive end when the processor determines that the timer expires or the maximum transmission quantity is 0.

The starting, by the transmit end, a timer before sending the data includes: starting, by the transmit end, the timer before obtaining new to-be-sent data, or starting the timer when new data reaches the transmit end.

In still another implementation, the processor is configured to start a timer before the data is sent, where a preset value of the timer is the maximum transmission latency corresponding to the service type of the data;

the processor decreases the maximum transmission quantity by 1 each time the transceiver transmits data to the receive end (including the first time of data transmission); and the transceiver stops sending the retransmission data to the receive end when the processor determines that the timer does not expire and the maximum transmission quantity is not 0, but a remaining time of the timer is less than a time required by the receive end to receive and process the retransmission data.

In yet another implementation, the processor is configured to start the timer before the data is sent, and the processor decreases the maximum transmission quantity by 1 each time the transceiver transmits data to the receive end (including the first time of data transmission); and the transceiver sends the retransmission data to the receive end when the processor determines that the timer does not expire, the maximum transmission quantity is not 0, and a remaining time of the timer is greater than or equal to a time required by the receive end to receive and process the retransmission data.

In the foregoing several implementations, the communications apparatus further includes:

a memory, configured to store an uplink transmission time-frequency resource pre-allocated by the receive end to the transmit end, where the processor calculates the maximum transmission quantity by using the following formula:

N_MAX=Floor(Total_Delay_MAX/Single_Tx_Delay), where

Floor ( ) means rounding down;

Total_Delay_MAX represents the maximum transmission latency corresponding to the service type of the data; and Single_Tx_Delay represents the single transmission latency corresponding to the service type of the data.

In the foregoing several implementations, when the transceiver requests the receive end to schedule an uplink transmission time-frequency resource to send the data, the processor is further configured to calculate the maximum transmission quantity by using the following formula:

N_MAX=Floor((Total_Delay_MAX-Delta_T)/Single_Tx_Delay), where

Floor ( ) means rounding down;

Total_Delay_MAX represents the maximum transmission latency corresponding to the service type of the data;

Delta_T represents a latency for requesting to schedule the resource;

and

Single_Tx_Delay represents the single transmission latency corresponding to the service type of the data.

In the foregoing several implementations, the processor calculates, by using the following formula, the single transmission latency of a service corresponding to the data:

Single_Tx_Delay $\in$ [(T_Tx−T_AI+T_Rx+T_Bu), (T_Gap+T_Tx+T_AI+T_Rx+T_Bu)], where T_Gap≥0 ms represents a time interval between two adjacent transmission resources for sending uplink data, T_Tx>0 ms represents a latency required by the processor of the transmit end to process data, T_Rx>0 ms represents a latency required by the receive end to process received data, T_Rx>0 ms represents a latency required to transmit data through an air interface, and T_Bu>0 ms represents a latency required when data at the transmit end waits to be sent in a buffer.

In the foregoing several implementations, the processor calculates, by using the following formula, the latency for requesting to schedule the resource:

Delta_T $\in$ [(T_AI_SR+T_Gap_SR_D), (T_Gap_SR+T_AI_SR+T_Gap_SR_D)], where

T_Gap_SR≥0 ms represents a time interval between two adjacent transmission resources for sending scheduling requests;

T_AI_SR>0 ms represents a latency required by the transmit end to send a scheduling request through an air interface; and T_Gap_SR_D≥0 ms represents a time interval between a moment at which the transceiver of the transmit end sends the scheduling request and a moment at which the receive end allocates, to the transmit end, a transmission resource for sending uplink data.

After the communications apparatus provided in this embodiment is implemented, the maximum transmission latency is set, so that redundant transmission caused because data related to all services needs to be retransmitted for same times can be avoided, and information exchange between transmit ends is reduced, thereby reducing operation processing complexity of retransmission and reducing a retransmission feedback time.

According to still another aspect, the communications apparatus provided in this embodiment may further use a dual determining mechanism. To be specific, in this application, data is transmitted by jointly determining whether the maximum transmission quantity is exhausted and determining whether the maximum transmission latency is exhausted. When either the maximum transmission latency is exhausted or the maximum transmission quantity is exhausted, the transmit end stops transmitting data to the receive end, to avoid redundant transmission and invalid retransmission, so that data transmission efficiency is higher.

According to another aspect, an embodiment provides a base station. The base station has a function of implementing behavior of the base station in the foregoing method design. The function may be implemented by hardware, or may be implemented by executing corresponding software by hardware. The hardware or the software includes one or more modules corresponding to the foregoing function.

In one implementation, a structure of the base station includes a processor and a transceiver. The processor is configured to support the base station in performing a corresponding function in the foregoing method. The transceiver is configured to: support communication between the base station and UE, send information or signaling in the foregoing method to the UE, and receive information or an instruction sent by the base station. The base station may further include a memory. The memory is configured to be coupled to the processor, and the memory stores a program instruction and data that are necessary to the base station.

According to still another aspect, an embodiment provides a terminal. The terminal has a function of implementing behavior of the terminal in the foregoing method design. The terminal may be a D2D terminal. The function may be implemented by hardware, and a structure of the UE includes a transceiver and a processor. Alternatively, the function may be implemented by executing corresponding software by hardware. The hardware or the software includes one or more modules corresponding to the foregoing function. The module may be software and/or hardware.

According to yet another aspect, an embodiment provides a control node, where the control node may include a controller/processor, a memory, and a communications unit. The controller/processor may be configured to coordinate resource management and configuration among a plurality of base stations. The memory may be configured to store program code and data of the control node. The communications unit is configured to support the control node in communicating with a base station, for example, sending information about a configured resource to the base station.

According to yet another aspect, an embodiment provides a communications system. The system includes the base station and the terminal in the foregoing aspects. Optionally, the system may further include the control node in the foregoing embodiment.

According to yet another aspect, an embodiment provides a computer storage medium, configured to store a computer software instruction used by the foregoing base station. The computer software instruction includes a program designed to perform the foregoing aspects.

According to yet another aspect, an embodiment provides a computer storage medium, configured to store a computer software instruction used by the foregoing UE. The computer software instruction includes a program designed to perform the foregoing aspects.

DESCRIPTION OF DRAWINGS

To describe the technical solutions in various embodiments more clearly, the following briefly describes the accompanying drawings required for describing various embodiments. Apparently, the accompanying drawings in the following description show merely some embodiments of this application, and a person of ordinary skill in the art may derive other drawings from these accompanying drawings without creative efforts.

DESCRIPTION OF EMBODIMENTS

Figure 1:
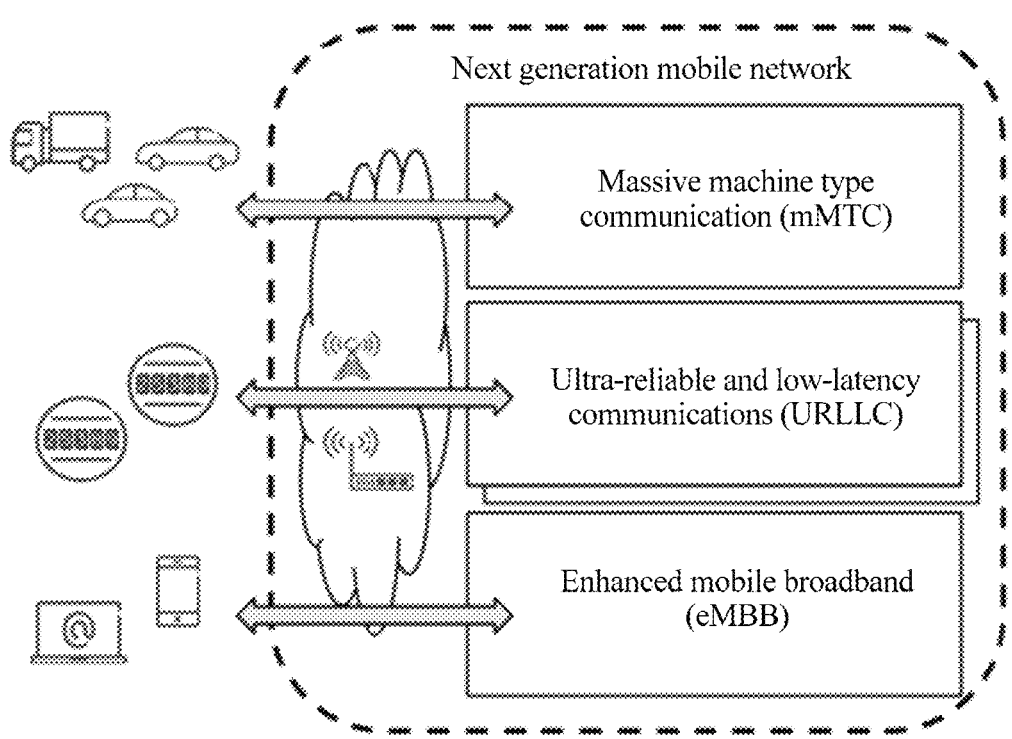
FIG. 1 is a schematic scenario diagram of a future network according to an embodiment.

A new communication requirement poses various challenges to an existing network in terms of technologies and commercial modes, and needs to be met by a next generation mobile network (Next Generation Mobile Network, NGMN). As shown in FIG. 1, main mobile network services of NGMN are classified into three types of scenarios: enhanced mobile broadband (eMBB, Enhanced Mobile Broadband), ultra-reliable and low latency communications URLLC, and massive machine type communication (mMTC, Massive Machine Type Communications).

In a data retransmission solution provided in the prior art, expiration data and redundant transmission are easily caused. A main reason is as follows: Different services have different latency requirements, and a latency (including waiting for a transmission occasion, processing at a transmit end, transmission through an air interface, processing at a receive end, and the like) consumed in one time of transmission is also strongly related to a system configuration such as a frame structure. As a result, if only one maximum retransmission quantity is specified without considering a specific service and the system configuration as in existing LTE, and retransmission is always performed based on the specified maximum retransmission quantity, expiration data and redundant transmission are very likely caused, and this has a negative impact on an entire system. Because different service types have different latency requirements, how to enable data transmission to meet a latency requirement is a technical direction for resolving the prior-art problem. In addition, because different system configurations can support different maximum transmission quantities, how to determine the maximum transmission quantity to enable data transmission to meet a requirement of the maximum transmission quantity is another technical direction for resolving the prior-art problem.

To resolve the foregoing problem that expiration data and redundant transmission are easily caused during data retransmission and to ensure effectiveness and reliability of data retransmission, an embodiment provides a data retransmission technology. The data retransmission technology provided may be applied to any scenario in which data needs to be retransmitted.

The data retransmission solution provided in this embodiment is as follows:

According to one aspect, this embodiment provides a technical solution for determining, based on a timer, whether to send retransmission data. For achieving this, in some embodiments, a transmit end starts the timer before sending new data to a receive end. For example, the transmit end starts the timer when obtaining new to-be-sent data, or the transmit end starts the timer when the transmit end generates new to-be-sent data or when new data reaches the transmit end. Each time before data is sent (including the first time of transmission and retransmission) or before retransmission data needs to be sent, the transmit end determines whether the timer has a remaining time. If the timer has no remaining time or the remaining time is insufficient for one time of data transmission, the transmit end stops sending the data. In this way, the following prior-art problem is avoided: Because a maximum retransmission quantity is not exhausted but a maximum transmission latency is exhausted, the transmit end still sends data, and consequently the receive end receives expiration data. This can avoid redundant transmission and save transmission resources.

It should be noted that, the first time of transmission in this embodiment is different from retransmission and may be understood as sending new data by the transmit end to the receive end. In all embodiments of this application, starting the timer means that the transmit end immediately starts the timer when obtaining to-be-sent data, or means that the transmit end starts the timer when the transmit end generates new to-be-sent data or when new data reaches the transmit end, and is different from a prior-art manner in which the timer is started when retransmission data is sent after the first time of data transmission. The maximum transmission latency is a total tolerable latency from a moment at which the transmit end obtains new data and then sends the new data to a moment at which the receive end receives the data, and also includes a time from obtaining the data for buffering to the first time of transmission. Therefore, in this embodiment, the transmit end immediately starts the timer when obtaining new data. However, in the prior art, both a buffering time and a transmission time of the first time of transmission are ignored. In this way, the timer still expires actually in the last time of transmission, and consequently invalid retransmission is caused. Therefore, in this application, a method in which the transmit end immediately starts the timer when obtaining new to-be-sent data is used. Compared with the prior art, the method is more accurate, so that quality and efficiency of data transmission can be ensured.

According to another aspect, a maximum transmission latency corresponding to transmission data varies with a service type of the transmission data. Therefore, a maximum transmission quantity can be determined based on the maximum transmission latency. After obtaining new data, the transmit end performs transmission for the first time and retransmission based on the maximum transmission quantity, instead of performing retransmission based on a same maximum retransmission quantity specified by a system. Therefore, redundant transmission caused because data related to all services needs to be retransmitted for same times is avoided, and information exchange between transmit ends is reduced, thereby reducing operation processing complexity of retransmission and reducing a retransmission feedback time.

According to still another aspect, a dual determining mechanism may also be used. For achieving this, data can be transmitted by jointly determining whether the maximum transmission quantity is exhausted and determining whether the maximum transmission latency is exhausted. When either the maximum transmission latency is exhausted or the maximum transmission quantity is exhausted, the transmit end stops transmitting data to the receive end, to avoid redundant transmission and invalid retransmission, so that data transmission efficiency is higher.

It should be noted that, the maximum transmission quantity in various embodiments includes the first time of transmission and a retransmission quantity, and is different from the maximum retransmission quantity in the prior art. The maximum transmission latency is a total tolerable latency from a moment at which the transmit end obtains new data and then sends the new data to a moment at which the receive end receives the data, and also includes a buffering time before the first time of transmission and a time of the first time of transmission. In this embodiment, the maximum transmission quantity is used to control a quantity of times of transmitting data by the transmit end to the receive end. However, for the maximum retransmission quantity used in the prior art, only a retransmission quantity is actually considered, and the buffering time, the transmission time, and the like of the first time of transmission are ignored. In this way, the last time of transmission still actually does not meet a requirement of the maximum transmission latency, but still falls within an allowable range of the maximum retransmission quantity, and this causes invalid retransmission. Therefore, compared with the maximum retransmission quantity in the prior art, the maximum transmission quantity used in this application is more accurate, so that quality and efficiency of data transmission can be ensured.

To further describe the data retransmission technology provided in this embodiment, a communications system used in the data transmission technology provided in this embodiment is first described herein.

Figure 2:
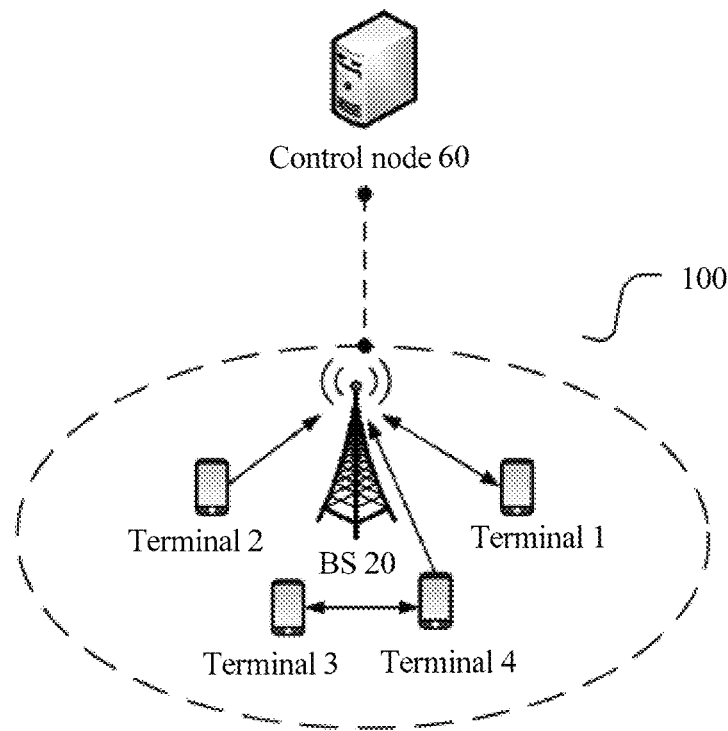
FIG. 2 is a schematic architectural diagram of a communications system according to an embodiment.

As shown in FIG. 2, an embodiment provides a communications system 100. The communications system 100 at least includes at least one base station (base station, BS) 20 and a plurality of terminals such as a terminal 1, a terminal 2, a terminal 3, and a terminal 4. These terminals may be terminals used for D2D (Device to Device, device-to-device) communication, for example, the terminal 3 and the terminal 4, or may be terminals used for cellular communication, for example, the terminal 1, the terminal 2, and the terminal 4. Cellular communication is communication between a terminal and a base station. Certainly, some terminals may perform cellular communication, and may also be used as D2D communication terminals for performing D2D communication. For example, the terminal 4 may perform both cellular communication and D2D communication.

Data retransmission in this embodiment may be data retransmission performed between the base station and a cellular terminal in the communications system 100, or may be data retransmission performed between D2D terminals.

In cellular communication, the terminal 1 establishes an RRC connection to the BS 20 to enter an RRC connected mode, and then sends an SR request to the BS 20. If the BS 20 allows the terminal 1 to send uplink data, the BS 20 sends a grant instruction to the terminal 1. Only after receiving the grant instruction, the terminal 1 can send the uplink data to the BS 20 based on an instruction requirement. Uplink data transmission between the terminal 1 and the BS 20 is granted transmission.

After establishing an RRC connection to the BS 20 to enter the RRC connected mode, the terminal 2 generates a transmission signal based on an uplink transmission resource pre-allocated by the BS 20, and directly sends uplink data to the BS 20 without a grant of the BS 20. For ease of description, in this specification, direct data transmission between the terminal 2 and the BS 20 without the grant of the BS 20 is referred to as grant free (Grant free or grantless) transmission.

The data retransmission solution in this embodiment may be applied to both a granted transmission scenario and a grant free transmission scenario.

In this embodiment, a control node 60 connected to the BS 20 may schedule resources in the system together, and may configure a resource for a terminal, make a resource multiplexing decision, perform interference coordination, or the like.

In this embodiment, the communications system 100 may be various radio access technology (radio access technology, RAT) systems, for example, a global system for mobile communications (Global System of Mobile communication, GSM) system, a code division multiple access (Code Division Multiple Access, CDMA) system, a wideband code division multiple access (Wideband Code Division Multiple Access Wireless, WCDMA) system, a general packet radio service (General Packet Radio Service, GPRS) system, a long term evolution (Long Term Evolution, LTE) system, a universal mobile telecommunications system (Universal Mobile Telecommunications System, UMTS), a next-generation mobile communications system (for example, 5G), and a machine-to-machine (Machine to Machine, M2M) communications system.

The terms "system" and "network" may be interchanged. The CDMA system may implement wireless technologies such as universal terrestrial radio access (universal terrestrial radio access, UTRA) and CDMA2000. UTRA may include a wideband CDMA (wideband CDMA, WCDMA) technology and another variation technology of CDMA. CDMA2000 may cover an interim standard (interim standard, IS) 2000 (IS-2000), an IS-95 standard, and an IS-856 standard. A TDMA system may implement wireless technologies such as global system for mobile communications (global system for mobile communication, GSM). An OFDMA system may implement wireless technologies such as evolved universal terrestrial radio access (evolved UTRA, E-UTRA), ultra mobile broadband (ultra mobile broadband, UMB), IEEE 802.11 (Wi-Fi), IEEE 802.16 (WiMAX), IEEE 802.20, and Flash OFDMA. UTRA and E-UTRA are respectively an evolved version of UMTS and an evolved version of UMTS. A new version of UMTS, namely, E-UTRA, is used in 3GPP long term evolution (long term evolution, LTE) and various versions evolved based on LTE. In addition, the communications system 100 may be further applicable to future-oriented communications technologies.

System architectures and service scenarios described in this embodiment are intended to describe the technical solutions in this embodiment more clearly, but are not intended to limiting. A person of ordinary skill in the art may learn that, as the network architectures evolve and a new service scenario emerges, the technical solutions provided in this embodiment may also be applicable to a similar technical problem.

The base station in this embodiment is an apparatus that is deployed in a radio access network and that is configured to provide a wireless communication function for a terminal. The base station may include a macro base station, a micro base station (also referred to as a small cell), a relay node, an access point, and the like in various forms. In systems that use different radio access technologies, a device that has a base station function may have different names. For example, the device is referred to as an evolved NodeB (evolved NodeB, eNB or eNodeB) in an LTE system, or is referred to as a NodeB (NodeB) in a 3rd generation (3rd generation, 3G) system. For ease of description, in various embodiments, all the foregoing apparatuses that provide a wireless communication function for the terminal are collectively referred to as a base station or a BS.

In the communications system shown in FIG. 2, the control node may be connected to a plurality of base stations, and configure resources for a plurality of D2D terminals and cellular terminals that are covered by the plurality of base stations. For example, the base station may be a NodeB in the UMTS system, and the control node may be a network controller. For another example, the base station may be a small cell, and the control node may be a macro base station covering the small cell. For another example, the control node may be an inter-RAT coordination controller in a wireless network or the like, and the base station is a base station in the wireless network. This is not limited in this embodiment.

The foregoing describes the communications system to which the data retransmission technology provided in this embodiment is applied. The following describes in detail a one implementation process of this application in the communications system. To clearly and briefly describe various embodiments, related concepts in various embodiments are first briefly described.

1. "Retransmission" in various embodiments may be applied to an uplink or downlink granted transmission scenario, an uplink grant free transmission scenario, or a scenario in which communication is performed between terminals, for example, data transmission in a D2D (Device to Device) or M2M (Machine to Machine) mode. In addition, the retransmission data in various embodiments is a part or all of data that is previously transmitted by a transmit end to a receive end for the first time.

2. "Transmit end" and "receive end"

During downlink transmission, the transmit end is a network side device such as a base station or a control node, and the receive end is a terminal.

During uplink transmission (uplink grant free transmission or uplink granted transmission), the transmit end is a terminal, and the receive end is a network side device such as a base station or a control node.

During D2D transmission, the transmit end is a D2D terminal that sends data, and the receive end is a D2D terminal that receives data.

3. "Grant free transmission"

For ease of description, as used herein, grant free transmission is expressed as Grant Free in English and GF for short. However, grant free transmission may also be expressed in another form, for example, grantless. A meaning of grant free transmission is not limited in this specification. It may be understood that grant free transmission herein is not a proper noun and may have other names in actual application, but none of the names departs from the essence of this patent application. Grant free transmission is usually performed for an uplink signal, and may be understood as any one or more of the following meanings, but is not limited to the meanings. For example, grant free transmission may also be understood as a combination of some technical features in the following plurality of meanings or another similar meaning.

(1) Grant free transmission may be as follows: A network side device pre-allocates a plurality of transmission resources and notifies a terminal device of the plurality of transmission resources. When having an uplink signal transmission requirement, the terminal device selects at least one transmission resource from the plurality of transmission resources pre-allocated by the network side device, and sends an uplink signal by using the selected transmission resource. The network side device detects, on one or more of the plurality of pre-allocated transmission resources, the uplink signal sent by the terminal device. The detection may be blind detection, may be detection performed based on a control field in the uplink signal, or may be detection performed in another manner.

(2) Grant free transmission may be as follows: A network side device pre-allocates a plurality of transmission resources and notifies a terminal device of the plurality of transmission resources, so that when the terminal device has an uplink signal transmission requirement, the terminal device selects at least one transmission resource from the plurality of transmission resources pre-allocated by the network side device, and sends an uplink signal by using the selected transmission resource.

(3) Grant free transmission may be as follows: A terminal device obtains information about a plurality of pre-allocated transmission resources; when having an uplink signal transmission requirement, selects at least one transmission resource from the plurality of transmission resources; and sends an uplink signal by using the selected transmission resource. The information may be obtained from a network side device.

(4) Grant free transmission may be a method in which a terminal device can transmit an uplink signal without dynamic scheduling performed by a network side device. Dynamic scheduling may be a scheduling manner in which the network side device indicates a transmission resource by using signaling for each time of uplink signal transmission performed by the terminal device. Optionally, that a terminal device can transmit an uplink signal may be understood as follows: Two or more terminal devices are allowed to transmit an uplink signal on a same time-frequency resource. Optionally, the transmission resource may be a transmission resource in one or more transmission time units following a moment at which the terminal receives the signaling. One transmission time unit may be a minimum time unit for one time of transmission, for example, a TTI (Transmission Time Interval) whose value may be 1 ms, or may be a preset transmission time unit.

(5) Grant free transmission may be as follows: A terminal device transmits an uplink signal without a grant of a network side device. The grant may mean that the terminal device sends an uplink scheduling request to the network side device, and the network side device sends an uplink grant to the terminal device after receiving the scheduling request, where the uplink grant indicates an uplink transmission resource allocated to the terminal device.

(6) Grant free transmission may be a contention-based transmission manner, and may be specifically as follows: A plurality of terminals simultaneously transmit an uplink signal on a part or all of a same pre-allocated time-frequency resource, without a grant of a network side device.

(7) Grant free transmission may be as follows: A network side device designates some uplink transmission time-frequency resources for a terminal, and the resources are specially used to perform uplink signal transmission that does not need to be granted.

(8) Grant free transmission may be as follows: After requesting a network side device to schedule an uplink transmission time-frequency resource and performing uplink transmission by using the uplink transmission time-frequency resource, a terminal keeps the uplink transmission time-frequency resource. Then, when the terminal needs to perform uplink transmission, the terminal directly uses the uplink transmission time-frequency resource, without requesting the network side device again to schedule an uplink transmission time-frequency resource in each time of uplink transmission.

The foregoing blind detection may be understood as detection performed on data that may arrive, without predicting whether data arrives. Alternatively, the blind detection may be understood as detection performed without an indication of explicit signaling.

4. "Data"

The data in various embodiments may be service data or signaling data.

5. "Transmission resource"

The transmission resource in various embodiments may include but is not limited to one or more of the following resources:

a time domain resource such as a radio frame, a subframe, or a symbol;

a frequency domain resource such as a subcarrier or a resource block;

a space domain resource such as a transmit antenna or a beam;

a code domain resource such as a sparse code multiple access (English full name: Sparse Code Multiple Access, SCMA for short) codebook, a low density signature (English full name: Low Density Signature, LDS for short) sequence, or CDMA code; and an uplink pilot resource.

Both the transmit end and the receive end that are used for data retransmission in various embodiments may be collectively referred to as a communications apparatus. An implementation of the communications apparatus is a network side device, and another implementation of the communications apparatus is a terminal.

The network side device may include a system and a device that serve as improvements to peer devices in a conventional wireless telecommunications system. This type of advanced or next-generation device may be included in an evolved wireless communications standard (for example, long term evolution (LTE)). For example, an LTE system may include an evolved universal terrestrial radio access network (E-UTRAN) NodeB (eNB), a radio access point, or a similar component, instead of a conventional base station. Any such component is referred to as an eNB in this specification, but it should be understood that the component is not necessarily an eNB. In a next-generation communications system, the eNB in the LTE system is replaced with a "gNB".

In some examples, the network side device may be the BS 20 or the control node 60 that is shown in FIG. 2, and the terminal may be one or more of the terminal 1, the terminal 2, or the terminal 3 that is shown in FIG. 2.

The network side device may be a device used to communicate with a mobile station, or may be an access point (ACCESS POINT, AP) in a wireless local area network (Wireless Local Area Networks, WLAN) or a base transceiver station (Base Transceiver Station, BTS) in GSM or code division multiple access (Code Division Multiple Access, CDMA), or may be a NodeB (NodeB, NB) in WCDMA, or may be an evolved NodeB (Evolutional NodeB, eNB or eNodeB) in LTE, a relay node, an access point, an in-vehicle device, a wearable device, a network side device in a future 5G network, a network side device in a future evolved public land mobile network (Public Land Mobile Network, PLMN), or the like.

The embodiments are described with reference to the terminal herein. The terminal may also be referred to as user equipment (User Equipment, UE), a mobile station, an access terminal, a subscriber unit, a subscriber station, a mobile station, a remote station, a remote terminal, a mobile device, a user terminal, a wireless communications device, a user agent, a user apparatus, or the like. Alternatively, the terminal may be a station (STAION, ST) in a wireless local area network (Wireless Local Area Networks, WLAN), or may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device with a wireless communication function, a computing device or another processing device connected to a wireless modem, an in-vehicle device, a wearable device, a mobile station in a future communications network (for example, 5G), a terminal device in a future evolved PLMN network, a D2D terminal, or the like.

Figure 3:
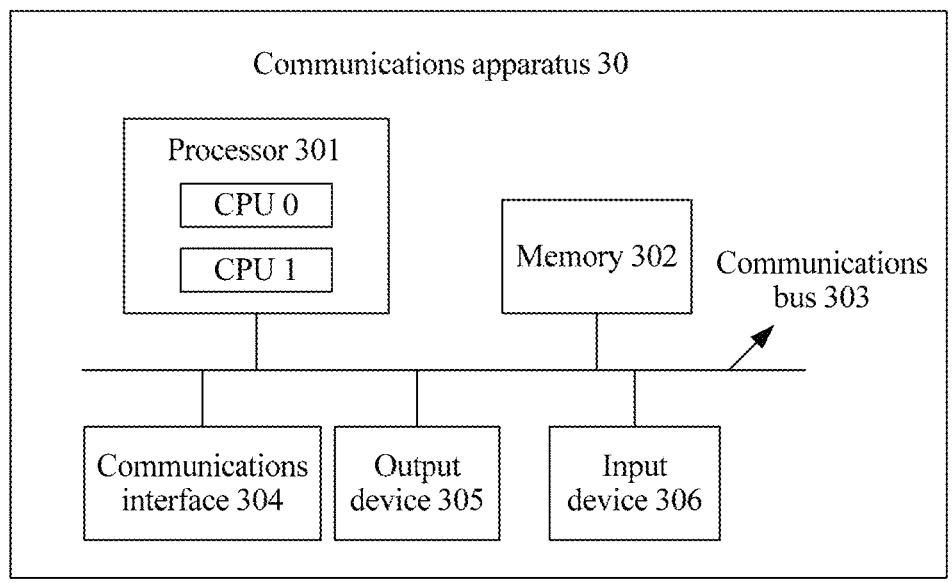
FIG. 3 is a schematic structural diagram of a communications apparatus according to an embodiment.

The communications apparatus in various embodiments may be implemented by a communications apparatus 30 shown in FIG. 3.

FIG. 3 is a schematic structural diagram of a communications apparatus 30 according to an embodiment. The communications apparatus 30 includes at least one processor 301, a memory 302, a communications bus 303, and at least one communications interface 304.

The processor 301 may be a central processing unit (CPU), a microprocessor, an application-specific integrated circuit (application-specific integrated circuit, ASIC), or one or more integrated circuits configured to control program execution of the solutions in this application.

The memory 302 may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer. However, the memory 302 is not limited thereto. The memory may exist independently, and is connected to the processor by using the communications bus 103. Alternatively, the memory may be integrated with the processor.

The memory 302 is configured to store application program code for performing the solutions in this application, and the processor 301 is configured to execute the application program code stored in the memory 302.

In one implementation, in an embodiment, the processor 301 may be one or more CPUs, one or more DSPs, a baseband processor, or the like, for example, a CPU 0 and a CPU 1 shown in FIG. 3.

In one implementation, the communications apparatus 30 may include a plurality of processors, and each processor may be a single-core (single-CPU) processor, or may be a multi-core (multi-CPU) processor. The processor herein may be one or more devices, circuits, and/or processing cores used to process data (for example, a computer program instruction).

In one implementation, the communications apparatus 30 may further include an output device 305 and an input device 306. The output device 305 communicates with the processor 301, and may display information in a plurality of manners. For example, the output device 305 may be a liquid crystal display (Liquid Crystal Display, LCD), a light emitting diode (Light Emitting Diode, LED) display device, a cathode ray tube (cathode ray tube, CRT) display device, a projector (projector), or the like. The input device 306 communicates with the processor 301, and may receive input of a user in a plurality of manners. For example, the input device may be a mouse, a keyboard, a touchscreen device, a sensing device, or the like.

The foregoing communications apparatus 30 may be a general-purpose communications apparatus or a dedicated communications apparatus. In one implementation, the communications apparatus 30 may be a desktop computer, a portable computer, a network server, a palmtop computer (Personal Digital Assistant, PDA), a mobile phone, a tablet computer, a wireless terminal device, a communications device, an embedded device, or a device having a structure similar to that in FIG. 3. A type of the communications apparatus 30 is not limited in this embodiment.

For ease of understanding and description, the following uses only a terminal and a base station as examples, uses the terminal as a transmit end, and uses the base station as a receive end, to describe the data retransmission technology in various embodiments. The transmit end is a network side device and the receive end is a terminal, or a scenario in which both the transmit end and the receive end are D2D terminals or M2M terminals is similar to this.

Figure 4:
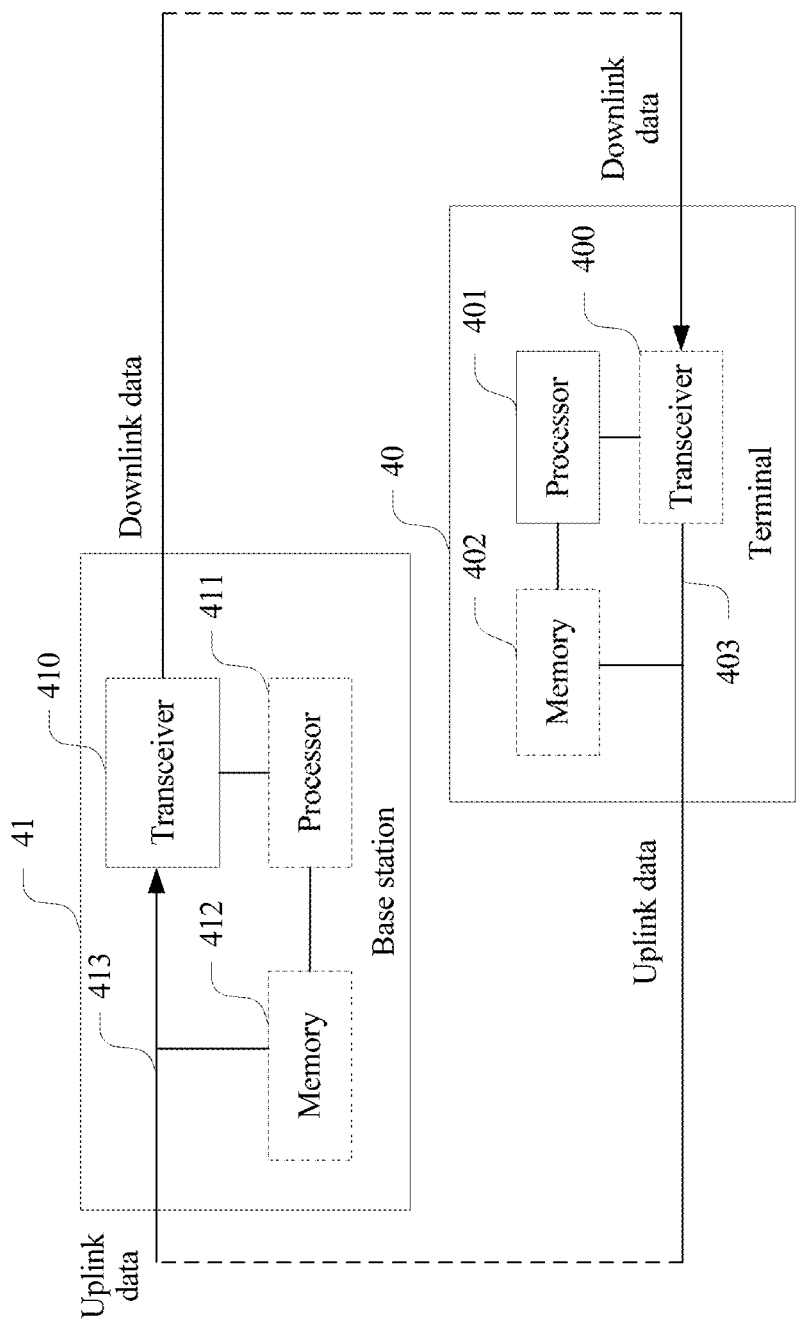
FIG. 4 is a schematic structural diagram of data retransmission performed between a terminal and a base station according to an embodiment.

FIG. 4 is a schematic structural diagram of data retransmission performed between a terminal and a base station according to an embodiment.

A terminal provided in this embodiment includes a transceiver 400 and a processor 401. The terminal 40 may further include a memory 402 that stores a computer executable instruction and a system bus 403. The system bus 403 is connected to the processor 401, the transceiver 400, the memory 402, and the like. A base station 41 includes a transceiver 410 and a processor 411. The base station 41 may further include a memory 412 that stores a computer executable instruction and a system bus 413. The system bus 413 is connected to the processor 411, the transceiver 410, the memory 412, and the like. The transceiver 400 of the terminal 40 sends initially transmitted uplink data and corresponding retransmitted data to the transceiver 410 of the base station 41 by using an antenna. The transceiver 410 of the base station 41 receives, by using an antenna, the initially transmitted data and the corresponding retransmitted data that are sent by the transceiver 401 of the terminal 40. Certainly, the base station 41 may send corresponding initially transmitted data or retransmitted data to the terminal.

The following describes, with reference to FIG. 4, various method embodiments in which data retransmission is performed between the terminal and the base station.

It should be understood that steps or operations shown in methods in the following embodiments are merely examples, and other operations or variations of the operations may be performed. In addition, in one implementation, the steps may be further performed in a sequence different from that described in various embodiments, and it is possible that not all the operations or steps shown in various embodiments need to be performed. Alternatively, more operations or steps than those shown in various embodiments may be performed.

Figure 5:
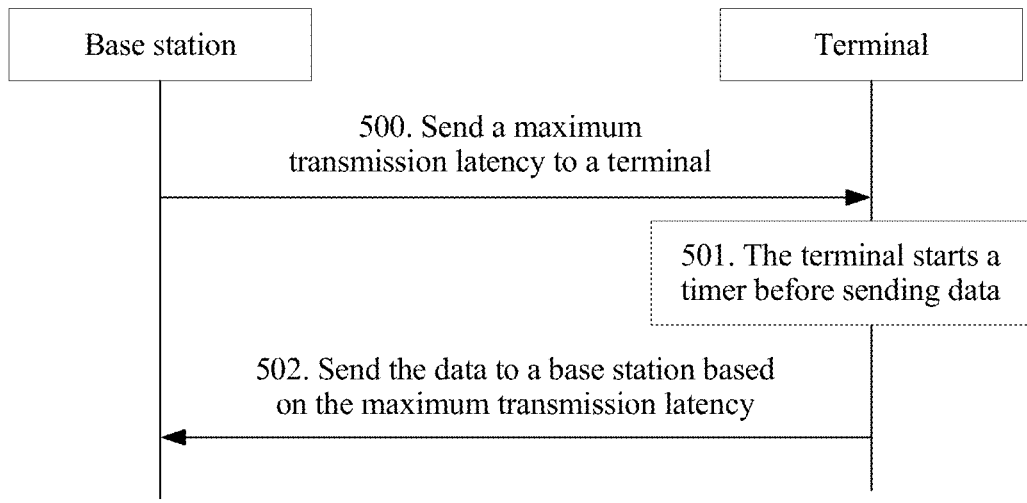
FIG. 5 is a schematic flowchart of Embodiment 1 of a data retransmission method according to an embodiment.

With reference to FIG. 4 and FIG. 5, Embodiment 1 of a data retransmission method in which a timer is set to control data retransmission to meet a requirement of a maximum transmission latency in an embodiment is described as follows:

Step 500: The transceiver 410 of the base station 41 first sends a maximum transmission latency to the transceiver 400 of the terminal 40.

In one implementation, a value of the maximum transmission latency is obtained or determined by the base station 41 from a quality of service (Quality of Service, QoS) parameter corresponding to a service type of the terminal 40. When a bearer is established, the QoS parameter is delivered by the base station 41 to the terminal 40 by using RRC (Radio Resource Control, radio resource control) signaling.

Step 501: The processor 401 of the terminal 40 is configured to immediately start a timer TIMER_Tx when new to-be-sent data is obtained, for example, when new data reaches the transceiver 400 of the terminal 40, where a preset value of the timer TIMER_Tx is a maximum transmission latency of a service corresponding to the data.

After the processor 401 starts the timer TIMER_Tx, the transceiver 400 of the terminal 40 transmits data to a data receive end, namely, the base station 41, for the first time. The transceiver 410 of the base station 41 receives the data transmitted by the transceiver 400 of the terminal 40 to the base station 41 for the first time and data retransmitted by the transceiver 400 of the terminal 40 to the base station 41.

Herein, that the transceiver 400 of the terminal 40 transmits data to a data receive end for the first time may be understood as sending new data or a new data packet to the receive end.

Step 502: When data needs to be retransmitted, the transceiver 400 of the terminal 40 retransmits the data to the base station 41 based on the maximum transmission latency. Herein, the data is retransmitted in the following two implementations:

Manner 1: The terminal 40 sends the retransmission data to the base station 41 when the timer TIMER_Tx does not expire, or the terminal 40 stops sending the retransmission data to the base station 41 when the timer TIMER_Tx expires.

Manner 2: The terminal 40 stops sending the retransmission data to the base station 41 when the timer TIMER_Tx does not expire and a remaining time of the timer TIMER_Tx is less than a time required by the base station 41 to receive and process the retransmission data.

In Manner 2, a time in which the terminal 40 sends the retransmission data to the base station 41 and a time in which the base station 41 receives and processes the retransmission data are considered. If the remaining time of the timer TIMER_Tx is only sufficient to send data by the terminal 40, and is insufficient to process the data by the base station 41, the data is invalid data after reaching the base station 41. Therefore, in this case, the terminal 40 should not retransmit the data. Retransmission is controlled more accurately in this manner.

The processor 411 of the base station 41 used as a receive end may also start a corresponding timer TIMER_Rx, to determine when data that is not successfully received needs to be discarded. The timer TIMER_Rx may be started after the data sent by the terminal 40 for the first time is received and processed, and a value of the timer TIMER_Rx is usually less than an allowable maximum transmission latency of the service.

In the foregoing embodiment, there are two mechanisms in which the terminal 40 determines whether data needs to be retransmitted: a feedback-based mechanism and a non-feedback-based mechanism.

Figure 6:
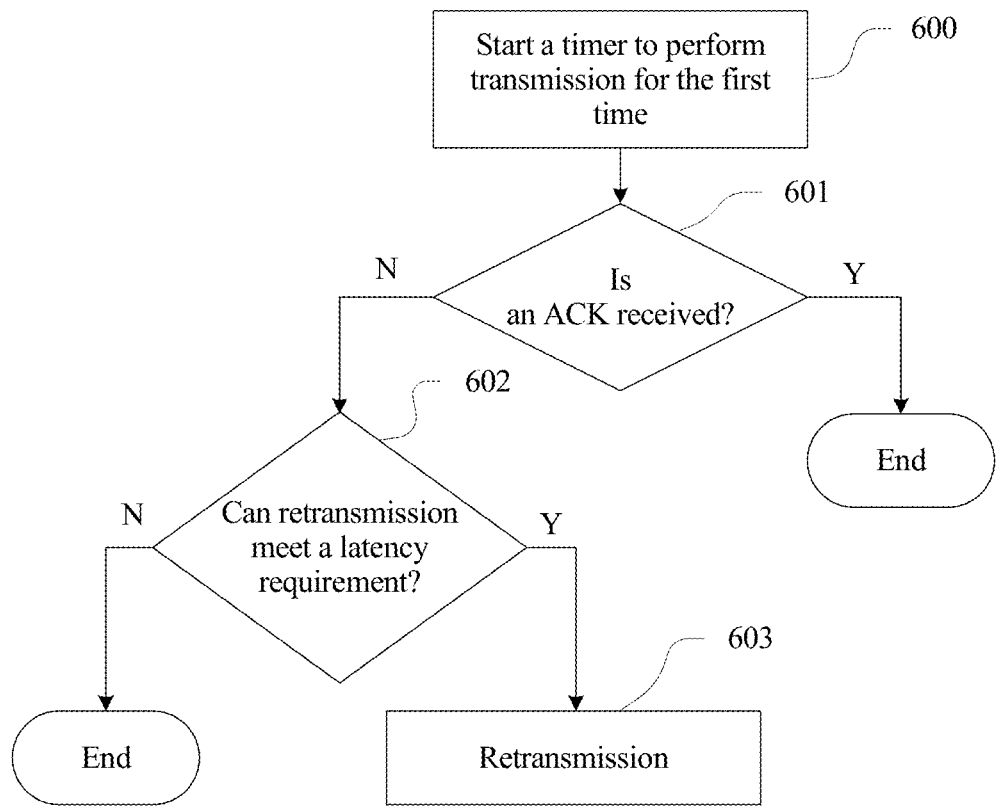
FIG. 6 is a schematic flowchart of Embodiment 2 of a data retransmission method according to an embodiment.

As shown in FIG. 6, in the feedback-based mechanism, a procedure of Embodiment 2 of a data retransmission method in an embodiment is as follows:

Step 600: The processor 401 of the terminal 40 immediately starts a timer TIMER_Tx when new to-be-sent data is obtained, for example, when new data reaches the transceiver 400 of the terminal 40.

Step 601: The transceiver 400 of the terminal 40 waits for a specific time to determine whether a positive feedback such as an ACK message from the base station 41 is received; and if the positive feedback from the base station 41 is received, the procedure ends; or if the positive feedback from the base station 41 is not received, determines that data needs to be retransmitted to the base station 41. Alternatively, step 601 may be: determining whether a negative feedback NACK message from the base station 41 is received; and if the negative feedback NACK message from the base station 41 is received, determining that data needs to be retransmitted to the base station 41; or if the negative feedback NACK message from the base station 41 is not received, the procedure ends.

Step 602: Before retransmitting data to the base station 41, the transceiver 400 of the terminal 40 first determines whether a current time of retransmission meets a requirement of a maximum transmission latency, that is, determines whether a remaining time of the timer TIMER_Tx is sufficient to support the current time of retransmission; and if the current time of retransmission meets the requirement of the maximum transmission latency, goes to step 603 to perform retransmission, where the retransmission herein includes two procedures in Manner 1 and Manner 2, and details are not described herein again; or if the current time of retransmission does not meet the requirement of the maximum transmission latency, the procedure ends.

Figure 7:
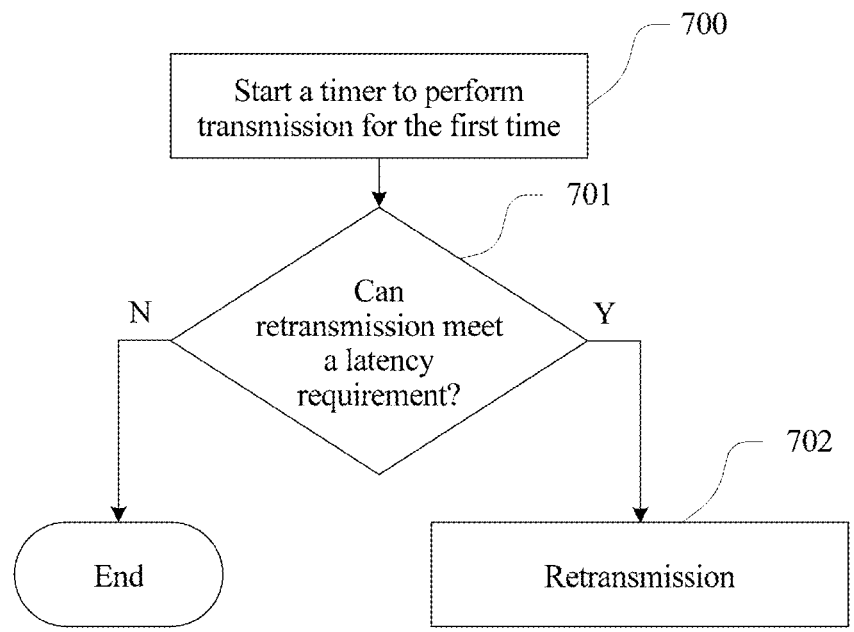
FIG. 7 is a schematic flowchart of Embodiment 3 of a data retransmission method according to an embodiment.

As shown in FIG. 7, in the non-feedback-based mechanism, in Embodiment 3 of a data retransmission method in an embodiment, after sending data, the terminal 40 does not need to wait for the base station 41 to feed back a receiving status of the data, but directly determines to retransmit the data on a possible subsequent sending occasion such as a slot or a subframe. Therefore, compared with FIG. 6, there is no need to determine whether a negative feedback such as a NACK message from the base station 41 is received or that a positive feedback such as an ACK message from the base station 41 is not received in a specific time. Instead, after a timer is started and transmission is performed for the first time, it is directly determined whether retransmission meets a maximum latency requirement. For a specific procedure, refer to FIG. 7. Other steps are similar to those in the embodiment shown in FIG. 6. Details are not described herein again.

After the foregoing data retransmission method is implemented, the terminal starts the timer when obtaining new to-be-sent data, and each time before data is sent (including the first time of transmission and retransmission) or before retransmission data is sent, the terminal determines whether the timer has a remaining time. If the timer has no remaining time or the remaining time is insufficient for one time of data transmission, the terminal stops sending the data. In this way, the following prior-art problem is avoided: Because a maximum retransmission quantity is not exhausted but a maximum transmission latency is exhausted, the terminal still sends data to the base station, and consequently the base station receives expiration data. This can avoid redundant transmission and save transmission resources.

A process in which the base station sends retransmission data to the terminal, a D2D terminal sends retransmission data to a D2D terminal, or an M2M terminal sends retransmission data to an M2M terminal is similar to the foregoing process. Details are not described again.

In addition, because a maximum transmission latency corresponding to transmission data varies with a service type of the transmission data. Therefore, herein, a maximum transmission quantity is determined based on the maximum transmission latency, and the maximum transmission quantity is used to instruct a retransmission process. Two manners of determining the maximum transmission quantity are respectively as follows:

Manner 1: The terminal determines the maximum transmission quantity from an indication message from the base station, where the maximum transmission quantity is determined by the base station based on a system configuration, the maximum transmission latency, and a single transmission latency.

Manner 2: The terminal determines, based on a system configuration, the maximum transmission latency, and a single transmission latency, the maximum transmission quantity for sending data.

The following describes, by using two scenarios, the data retransmission method provided in this application.

Figure 8:
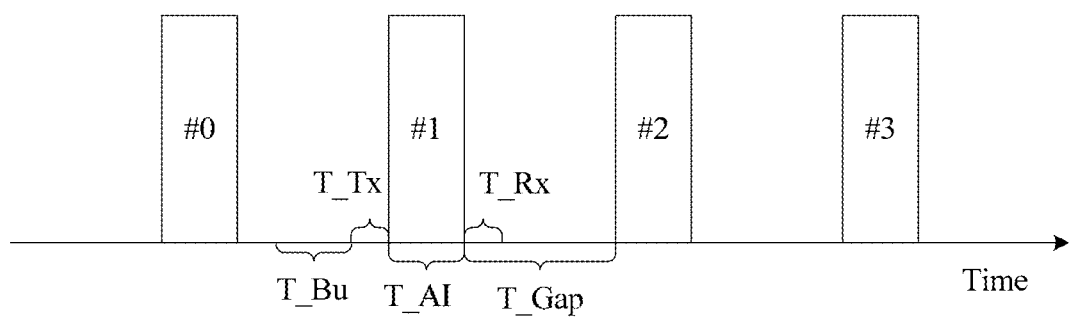
FIG. 8 is a schematic diagram of a transmission resource used in a data retransmission method according to an embodiment.

Grant free scenario: When the terminal sends data by using an uplink transmission time-frequency resource that is prestored by the terminal and that is allocated by the base station to the terminal, that is, in a grant free transmission scenario, for resource usage of the terminal, refer to FIG. 8. In this scenario, it is assumed that the terminal sends a data packet for the first time on a resource #0 used to send data. After sending the data packet for the first time on the resource #0, the terminal retransmits the data packet on a resource #1 if data needs to be retransmitted.

Regardless of whether the terminal or the base station calculates the maximum transmission quantity N_MAX, a manner of calculating the maximum transmission quantity is as follows:

N_MAX=Floor(Total_Delay_MAX/Single_Tx_Delay), where

Floor ( ) means rounding down; Floor(3.6)=3;

Total_Delay_MAX represents the maximum transmission latency corresponding to the service type of the data; and Single_Tx_Delay represents the single transmission latency corresponding to the service type of the data.

A manner of calculating the single transmission latency Single_Tx_Delay corresponding to the service type of the data is as follows:

Single_Tx_Delay ∈[(T_Tx+T_AI+T_Rx+T_Bu), (T_Gap+T_Tx+T_AI+T_Rx+T_Bu)], where

T_Gap≥0 ms represents a time interval between two adjacent transmission resources for sending data, T_Tx>0 ms represents a latency required by the transmit end to process data, T_Rx>0 ms represents a latency required by the receive end to process received data, where "process data" herein may mean processing data at a physical layer or processing data at a physical layer and another protocol layer, and the another protocol layer herein is a MAC (Media Access Control, media access control) layer, an RLC (Radio Link Control, radio link control) layer, or a PDCP (Packet Data Convergence Protocol, packet data convergence protocol) layer, T_Rx>0 ms represent a latency required to transmit data through an air interface, and T_Bu>0 ms represents a latency required when data at the transmit end waits to be sent in a buffer.

In one implementation, a value of Single_Tx_Delay is defined at least in the following manners:

Single_Tx_Delay=T_Gap+T_Tx+T_AI+T_Rx+T_Bu;
Single_Tx_Delay=T_Tx+T_AI+T_Rx+T_Bu;
Single_Tx_Delay=T_Gap/2+T_Tx+T_AI+T_Rx+T_Bu; and
Single_Tx_Delay=T_Gap/2+T_AI+T_Bu.

Figure 9:
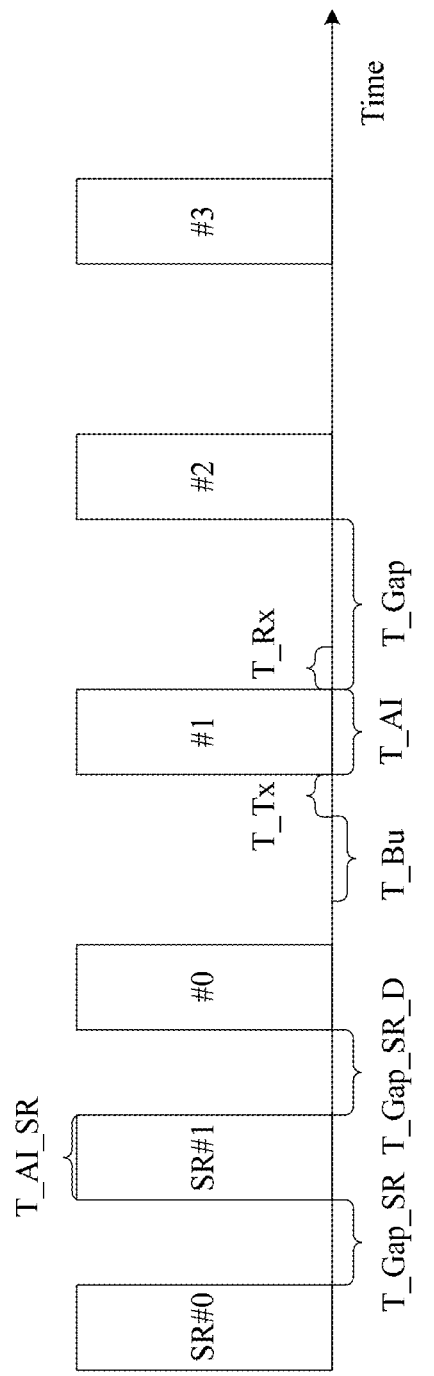
FIG. 9 is another schematic diagram of a transmission resource used in a data retransmission method according to an embodiment.

Granted scenario:

When the terminal requests the base station to schedule an uplink transmission time-frequency resource to send data, that is, in a granted transmission scenario, for resource usage of the terminal, refer to FIG. 9. In this scenario, it is assumed that the terminal sends a scheduling request on a resource SR #1 used to send a scheduling request (SR), and sends a data packet for the first time on a resource #0 that is used to send data and that follows the resource SR #1. After sending the data packet for the first time on the resource #0, the terminal retransmits the data packet on a resource #1 if data needs to be retransmitted.

Regardless of whether the terminal or the base station calculates the maximum transmission quantity N_MAX, a manner of calculating the maximum transmission quantity is as follows:

N_MAX=Floor(Total_Delay_MAX/Single_Tx_Delay), where

Floor ( ) means rounding down, for example, Floor(3.6)= 3;

Total_Delay_MAX represents the maximum transmission latency corresponding to the service type of the data;

Delta_T represents a latency for requesting to schedule the resource; and

Single_Tx_Delay represents the single transmission latency corresponding to the service type of the data.

A manner of calculating the latency Delta_T for requesting to schedule the resource is as follows:

Delta_T ∈[(T_AI_SR+T_Gap_SR_D), (T_Gap_SR+ T_AI_SR+T_Gap_SR_D)], where

T_Gap_SR≥0 ms represents a time interval between two adjacent transmission resources for sending scheduling requests;

T_AI_SR>0 ms represents a latency required by the transmit end to send a scheduling request through an air interface; and T_Gap_SR_D≥0 ms represents a time interval between a moment at which the terminal sends the scheduling request and a moment at which the base station allocates, to the terminal, a transmission resource for sending uplink data.

In one implementation, a value of Delta is defined in the following manners:

Delta_T=T_Gap_SR+T_AI_SR+T_Gap_SR_D;
Delta_T=T_AI_SR+T_Gap_SR_D; and
Delta_T=T_Gap_SR/2+T_AI_SR+T_Gap_SR_D.

In this scenario, a manner of calculating the single transmission latency Single_Tx_Delay corresponding to the service type of the data is the same as that in the grant free transmission scenario. Details are not described herein again.

Figure 10:
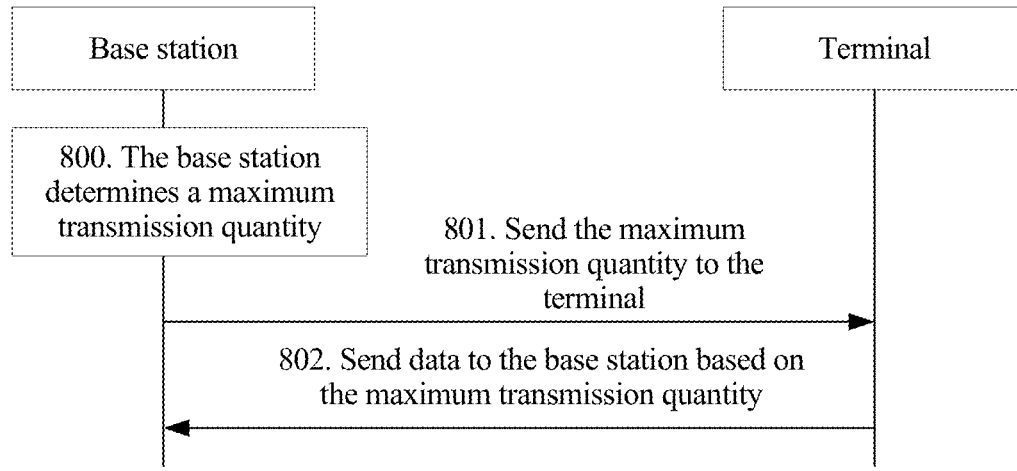
FIG. 10 is a schematic flowchart of Embodiment 4 of a data retransmission method according to an embodiment.

With reference to FIG. 4 and FIG. 10, Embodiment 4 of a data retransmission method in which a base station sets a maximum transmission quantity to control a terminal to perform data retransmission in an embodiment is described as follows:

In Embodiment 4, after obtaining new to-be-sent data, the terminal performs transmission for the first time and retransmission based on the maximum transmission quantity, instead of performing retransmission based on a same maximum retransmission quantity specified by a system, and the maximum transmission quantity is determined by the base station.

Details are as follows:

Step 800: The processor 411 of the base station 41 determines a maximum transmission quantity for transmitting data by the terminal 40, where a calculation manner in which the base station 41 determines the maximum transmission quantity is described above, and details are not described herein again.

Step 801: The transceiver 410 of the base station 41 sends the maximum transmission quantity to the terminal 40. In one implementation, the base station 41 may notify the terminal 40 of the determined maximum retransmission quantity in the following manners:

(1) The maximum transmission quantity is broadcast, for example, is carried in a system message (System Information, SI) and notified to the terminal 40. This is applicable to a grant free transmission scenario.

(2) The maximum transmission quantity is carried in higher layer dedicated radio resource control (Radio Resource Control, RRC) signaling and notified to the terminal 40, for example, an RRC reconfiguration instruction or a handover instruction. This is applicable to a granted transmission scenario or a semi-persistent scheduling (Semi-Persistent Scheduling, SPS) scenario.

(3) The maximum transmission quantity is carried in an underlying control signal and notified to the terminal 40, for example, downlink control information (Downlink Control Information, DCI).

Step 802: The terminal 40 sends data to the base station 41 based on the maximum transmission quantity. Specifically, each time the transceiver 400 of the terminal 40 sends data to the transceiver 410 of the base station 41, the processor 401 of the terminal 40 decreases the maximum transmission quantity by 1, and when the maximum transmission quantity is 0, the terminal 40 cannot send data to the base station 41.

Figure 11:
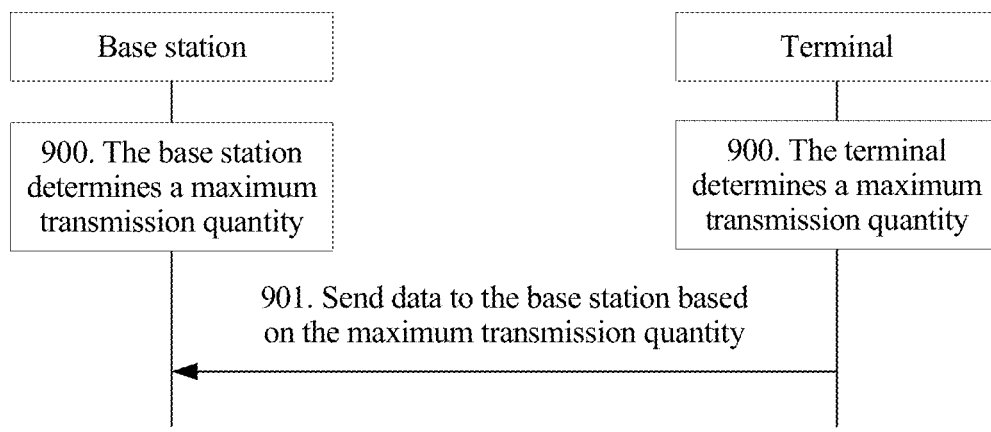
FIG. 11 is a schematic flowchart of Embodiment 5 of a data retransmission method according to an embodiment.

With reference to FIG. 4 and FIG. 11, Embodiment 5 of a data retransmission method in which a terminal sets a maximum transmission quantity to control the terminal to perform data retransmission in an embodiment is described as follows:

Step 900: The base station 41 and the terminal 40 separately determine a maximum transmission quantity. In this embodiment, the maximum transmission quantity is a current maximum transmission quantity, of the service, that is determined by the base station 41 and the terminal 40 according to a same rule, table, formula, and the like that is agreed in advance.

Step 901: The terminal 40 sends data to the base station 41 based on the maximum transmission quantity. Specifically, each time the transceiver 400 of the terminal 40 sends data to the transceiver 410 of the base station 41, the processor 401 of the terminal 40 decreases the maximum transmission quantity by 1, and when the maximum transmission quantity is 0, the terminal 40 cannot send data to the base station 41.

In one implementation for achieving process 900, the following two manners may be used:

(1) Formula

The base station 41 and the terminal 40 determine an allowable maximum transmission quantity of the service in a current system configuration according to a predefined formula. A method for obtaining the formula and a related parameter is the same as that described above. Details are not described again.

(2) Table

The base station 41 first classifies a service type or a QoS type corresponding to the data. When a service bearer is established, the base station 41 and the terminal 40 can learn of the service type or the QoS parameter type, and then obtain, based on a configured table, a maximum transmission quantity that can be currently supported. Table 1 includes at least two columns. One column is the service type or the QoS type, and the other column is the supported maximum transmission quantity corresponding to the service type or the QoS type. Table 1 is shown as follows:

TABLE 1

| Service type or QoS type | Maximum transmission quantity |
|---|---|
| 0 | 2 |
| 1 | 3 |
| 2 | 4 |

For example, when the service type or the QoS type is 0, the corresponding maximum transmission quantity is 2; when the service type or the QoS type is 2, the corresponding maximum transmission quantity is 3; and the rest is obtained by analogy. The maximum transmission quantity herein may be still calculated according to the foregoing formula, but does not need to be calculated by the base station 41 or the terminal 40, and only a calculation result needs to be preset on the terminal 40 and the base station 41 according to the formula.

In another implementation, in addition to the foregoing two columns, the configured table may further include a system configuration column, as shown in the following Table 2:

TABLE 2

| Service type or QoS type | System configuration type | Maximum transmission quantity |
|---|---|---|
| 0 | 0 | 2 |
|   | 1 | 4 |

For example, when the service type or the QoS type is 0 but a system configuration type is 0, the corresponding maximum transmission quantity is 2. For another example, when the service type or the QoS type is 0 but a system configuration type is 1, the corresponding maximum transmission quantity is 4. The system configuration type herein specifically indicates whether a transmission resource configured by the base station 41 for the terminal 40 is consecutive or inconsecutive. For example, when the system configuration type is 1, it indicates that the transmission resource is consecutive, or when the system configuration type is 0, it indicates that the transmission resource is inconsecutive. Certainly, this is only an example herein, and the system configuration type may be represented in another manner. When the configured transmission resource is consecutive in time domain, that is, the foregoing time interval T_Gap is 0, a relatively large maximum transmission quantity may be allocated to the terminal 40; or otherwise, a relatively small maximum transmission quantity may be allocated to the terminal 40.

In Embodiment 8 and Embodiment 9, the maximum transmission quantity is determined based on the maximum transmission latency. After obtaining new to-be-sent data, the transmit end performs transmission for the first time and retransmission based on the maximum transmission quantity, instead of performing retransmission based on the same maximum retransmission quantity specified by the system. Therefore, redundant transmission caused because data related to all services needs to be retransmitted for same times is avoided, and information exchange between transmit ends is reduced, thereby reducing operation processing complexity of retransmission and reducing a retransmission feedback time.

Likewise, data retransmission performed based on the maximum transmission quantity also has two procedures: feedback-based retransmission and non-feedback-based retransmission.

Figure 12:
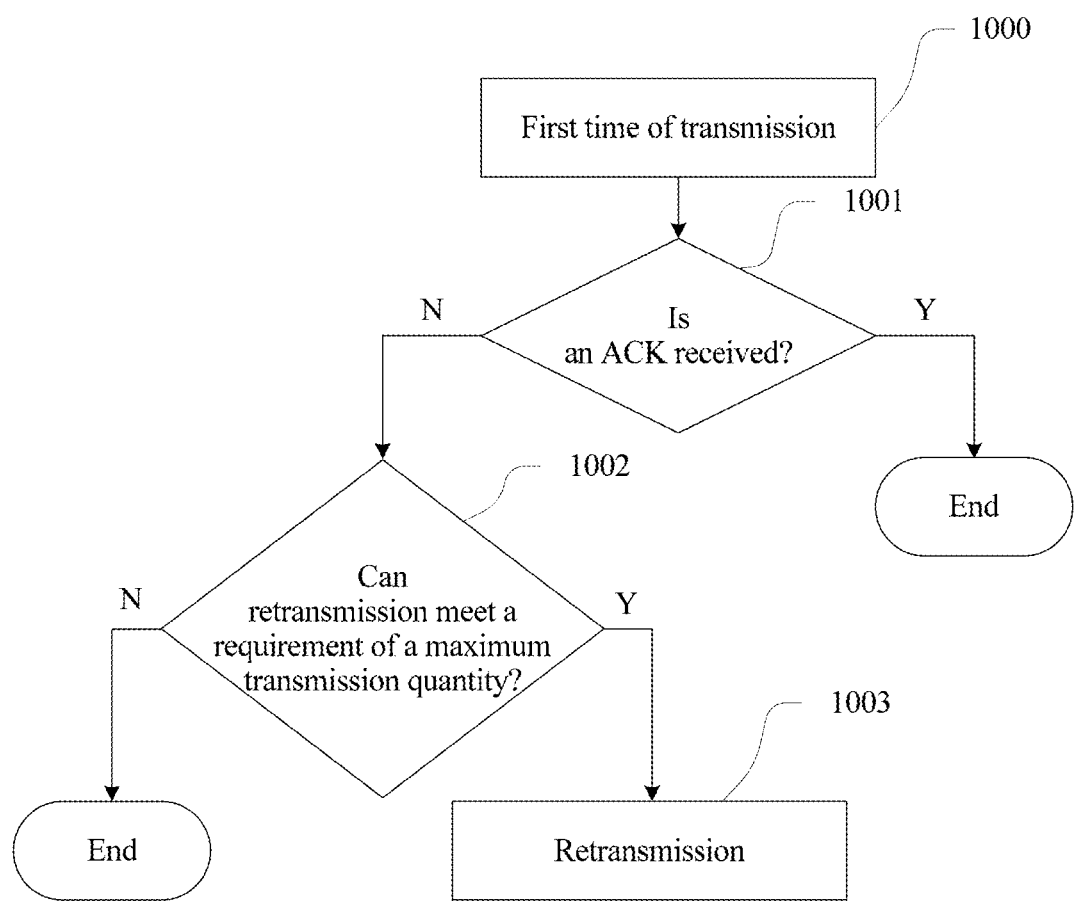
FIG. 12 is a schematic flowchart of Embodiment 6 of a data retransmission method according to an embodiment.

FIG. 12 is a schematic diagram of Embodiment 6 of a data retransmission method based on a feedback-based mechanism and a maximum transmission quantity according to this application.

The method is similar to that in FIG. 6. However, before retransmitting data, the processor 401 of the terminal 40 determines, in step 1002, whether retransmission meets a requirement of a maximum transmission quantity. If the retransmission meets the requirement of the maximum transmission quantity, the transceiver 410 of the terminal 40 sends retransmission data to the base station 41 in step 1003; or if the retransmission does not meet the requirement of the maximum transmission quantity, the transceiver 410 of the terminal 40 stops retransmission.

Figure 13:
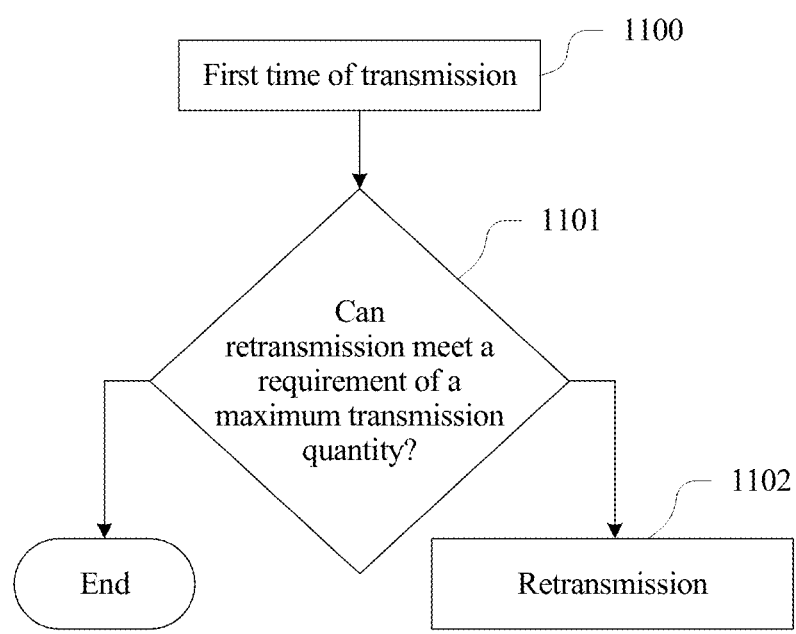
FIG. 13 is a schematic flowchart of Embodiment 7 of a data retransmission method according to an embodiment.

FIG. 13 is a schematic diagram of Embodiment 7 of a data retransmission method based on a non-feedback-based mechanism and a maximum transmission quantity according to this application.

The method is similar to that in FIG. 7. However, before data is retransmitted, it is determined, in step 1101, whether retransmission meets a requirement of a maximum transmission quantity. If the retransmission meets the requirement of the maximum transmission quantity, retransmission is performed in step 1102; or if the retransmission does not meet the requirement of the maximum transmission quantity, retransmission is stopped.

A dual determining mechanism may also be used in this embodiment. To be specific, in this application, data is transmitted by jointly determining whether the maximum transmission quantity is exhausted and determining whether the maximum transmission latency is exhausted. When either the maximum transmission latency is exhausted or the maximum transmission quantity is exhausted, the transmit end stops transmitting data to the receive end, to avoid redundant transmission and invalid retransmission, so that data transmission efficiency is higher.

In some embodiments, the terminal starts a timer when obtaining new to-be-sent data, where a preset value of the timer is a maximum transmission latency corresponding to a service type of the data; the terminal decreases the maximum transmission quantity by 1 each time the terminal sends data to the base station (including the first time of data transmission); and the terminal stops sending retransmission data to the base station when the timer expires or the maximum transmission quantity is 0.

Further, when the timer does not expire and the maximum transmission quantity is not 0, but a remaining time of the timer is less than a time required by the receive end to receive and process the retransmission data, the transmit end stops sending the retransmission data to the receive end; or when a remaining time of the timer is greater than or equal to a time required by the receive end to receive and process the retransmission data, the transmit end sends the retransmission data to the receive end.

Figure 14:
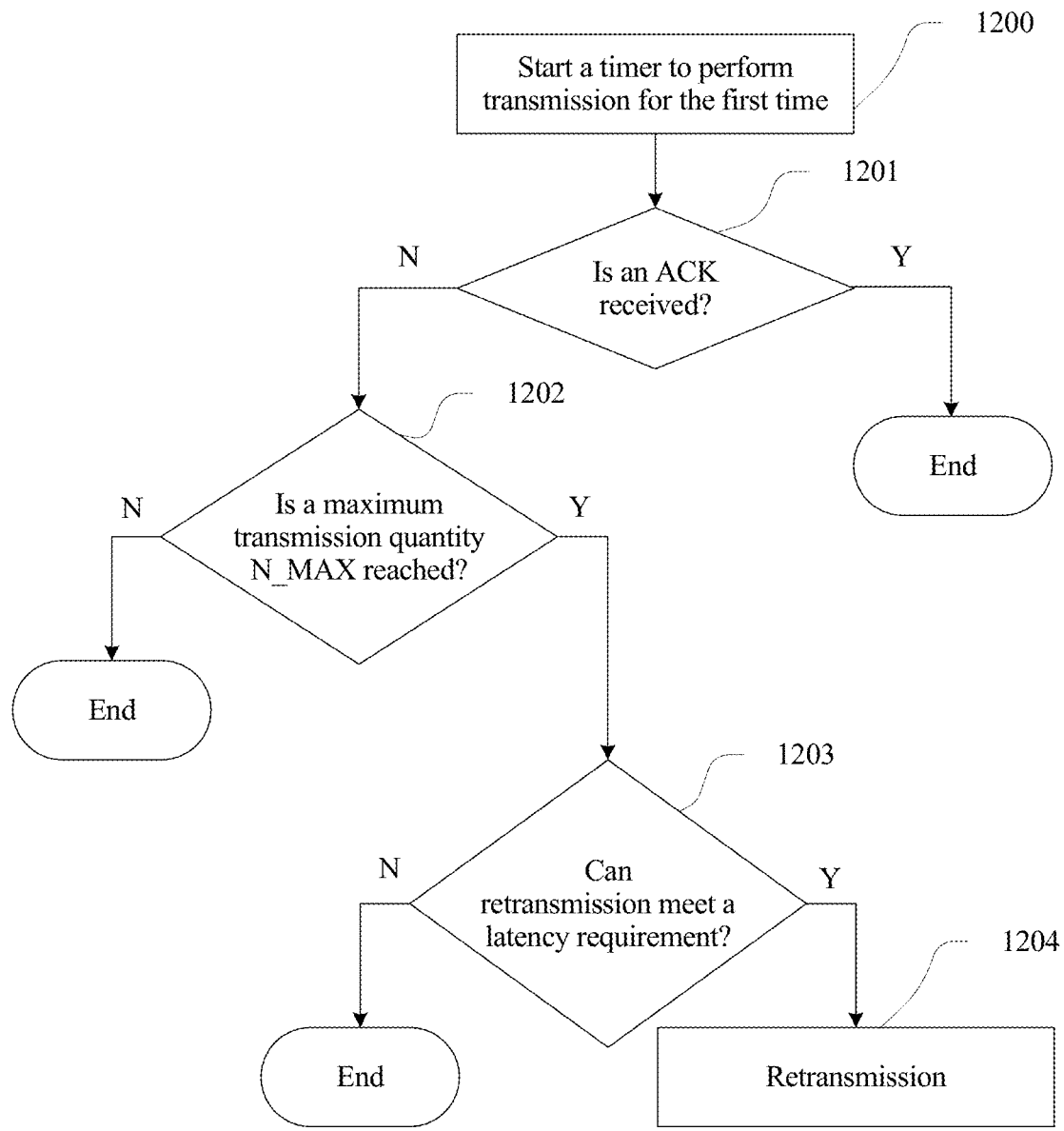
FIG. 14 is a schematic flowchart of Embodiment 8 of a data retransmission method according to an embodiment.

FIG. 14 is a schematic flowchart of Embodiment 8 of a data retransmission method in which a dual determining mechanism and a feedback-based mechanism are used according to an embodiment.

Method steps are as follows:

Step 1200: When the terminal 40 obtains new to-be-sent data, for example, when new data reaches the transceiver 400 of the terminal 40, the processor 401 of the terminal 40 immediately starts a timer TIMER_Tx to perform transmission for the first time.

Step 1201: The transceiver 400 of the terminal 40 waits for a specific time to determine whether a positive feedback such as an ACK message from the base station 41 is received; and if the positive feedback from the base station 41 is received, the procedure ends; or if the positive feedback from the base station 41 is not received, determines that data needs to be retransmitted to the base station 41. Alternatively, step 1201 may be: determining whether a negative feedback NACK message from the base station 41 is received; and if the negative feedback NACK message from the base station 41 is received, determining that data needs to be retransmitted to the base station 41; or if the negative feedback NACK message from the base station 41 is not received, the procedure ends.

Step 1202: The processor 401 of the terminal 40 determines whether a maximum transmission quantity is reached; and if the maximum transmission quantity is reached, goes to step 1203, where the transceiver 400 of the terminal 40 sends retransmission data to the base station 41; or if the maximum transmission quantity is not reached, retransmission ends.

Figure 15:
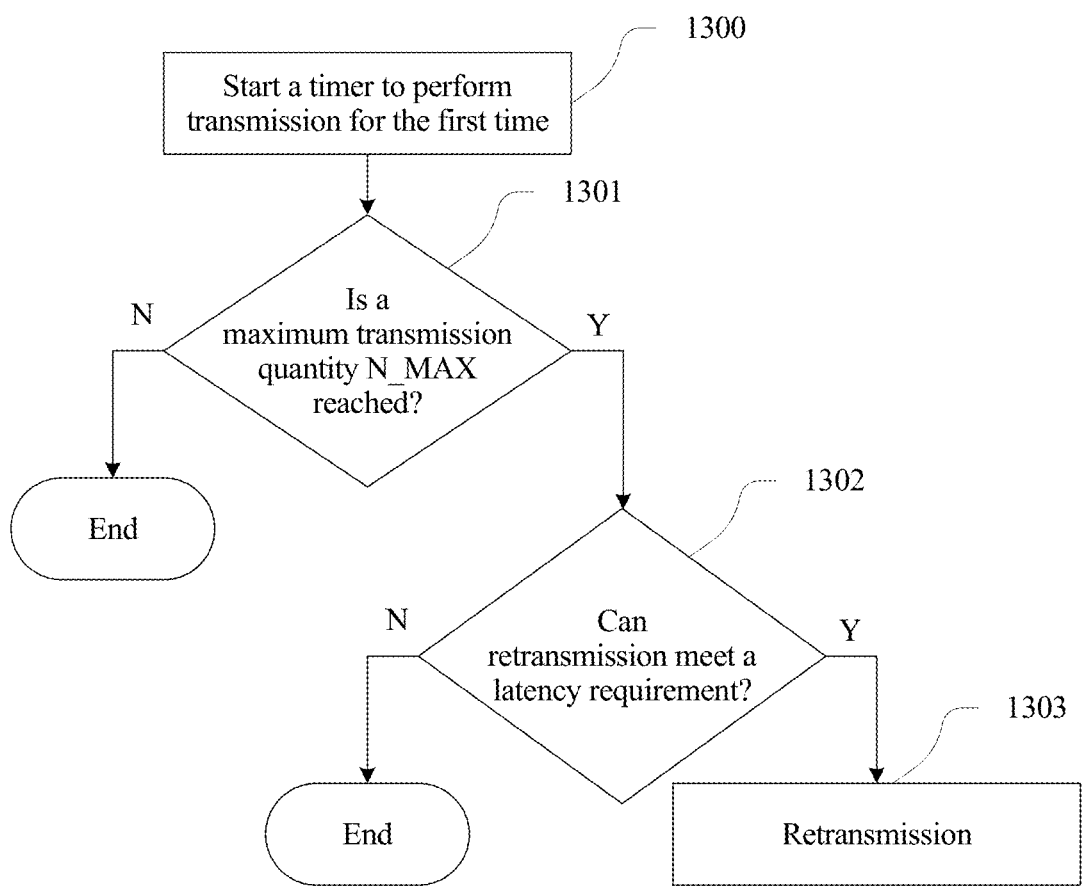
FIG. 15 is a schematic flowchart of Embodiment 9 of a data retransmission method according to an embodiment.

FIG. 15 is a schematic flowchart of Embodiment 9 of a data retransmission method in which a dual determining mechanism and a non-feedback-based mechanism are used according to an embodiment.

In this embodiment, after sending data, the terminal 40 does not need to wait for the base station 41 to feed back a receiving status of the data, but directly determines to retransmit the data on a possible subsequent sending occasion such as a slot or a subframe. Therefore, compared with FIG. 14, there is no need to determine whether a negative feedback such as a NACK message from the base station 41 is received or that a positive feedback such as an ACK message from the base station 41 is not received in a specific time. Instead, after a timer is started and transmission is performed for the first time, it is directly determined whether retransmission meets a maximum latency requirement. For a specific procedure, refer to FIG. 15. Other steps are similar to those in the embodiment shown in FIG. 14. Details are not described herein again.

It should be understood that sequence numbers of the foregoing processes do not mean execution sequences in various embodiments of this application. The execution sequences of the processes should be determined according to functions and internal logic of the processes, and should not be construed as any limitation on the implementation processes of various embodiments.

A person of ordinary skill in the art may be aware that, units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected based on actual requirements to achieve the objectives of the solutions of the embodiments.

In addition, function units in various embodiments may be integrated into one processing unit, or each of the units may exist alone physically, or two or more units may be integrated into one unit.

When the functions are implemented in a form of a software function unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a computer, a server, a network side device, or the like) to perform all or some of the steps of the methods described in various embodiments. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely one implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data retransmission method, comprising:
  starting, by a transmit end, a timer before transmitting new data to a receive end, wherein a preset value of the timer is a maximum transmission latency corresponding to a service type of the new data;

transmitting, by the transmit end, the new data to the receive end;

determining, by the transmit end, whether a current time of transmission exceeds a maximum transmission quantity;

sending, by the transmit end, retransmission data to the receive end when the timer does not expire and there is data to be retransmitted, wherein the retransmission data is a part or all of the data wherein when the transmit end sends the new data by using an uplink transmission time-frequency resource prestored by the transmit end and allocated by the receive end to the transmit end, wherein calculating the maximum transmission quantity is based on the following:

N_MAX=Floor (Total_Delay_MAX/Single_Tx_Delay), wherein

Floor( ) indicates rounding down;

Total_Delay_MAX represents the maximum transmission latency corresponding to the service type of the data; and Single_Tx_Delay represents a single transmission latency of a service corresponding to the data;

stopping sending, by the transmit end, the retransmission data to the receive end when the timer does not expire and the current time of transmission exceeds the maximum transmission quantity; and stopping sending, by the transmit end, the retransmission data to the receive end when the timer expires; and, wherein sending, by the transmit end, the retransmission data to the receive end when the timer does not expire and data needs to be retransmitted comprises:

stopping sending, by the transmit end, the retransmission data to the receive end when the timer does not expire and a remaining time of the timer is less than a time required by the receive end to receive and process the retransmission data.

2. The data retransmission method according to claim 1, wherein the starting, by the transmit end, the timer before transmitting the new data to the receive end comprises: starting, by the transmit end, the timer when obtaining the new data.

3. The data retransmission method according to claim 1, wherein the sending, by the transmit end, the retransmission data to the receive end when the timer does not expire and the retransmission data is to be retransmitted comprises:

sending, by the transmit end, the retransmission data to the receive end when the timer does not expire and the remaining time of the timer is greater than or equal to the time required by the receive end to receive and process the retransmission data.

4. The data retransmission method according to claim 1, wherein the method further comprises:

determining, by the transmit end, whether the current time of transmission exceeds the maximum transmission quantity, and sending, by the transmit end, the retransmission data to the receive end when the timer does not expire and the current time of transmission does not exceed the maximum transmission quantity.

5. The data retransmission method according to claim 1, wherein when the transmit end requests the receive end to schedule the uplink transmission time-frequency resource to send the data, calculating the maximum transmission quantity is based on the following:

N_MAX=Floor((Total_Delay_MAX−Delta_T)/Single_Tx_Delay), wherein Floor( ) indicates rounding down;

Total_Delay_MAX represents the maximum transmission latency corresponding to the service type of the data;

Delta_T represents a latency for requesting to schedule the uplink transmission time-frequency resource; and Single_Tx_Delay represents the single transmission latency of the service type corresponding to the data.

6. The data retransmission method according to claim 1, wherein

Single_Tx_Delay∈[(T_Tx+T_AI+T_Rx+T_Bu), (T_Gap+T_Tx+T_AI+T_Rx+T_Bu)], wherein

T_Gap≥0 ms represents a time interval between two adjacent transmission resources for sending uplink data, T_Tx>0 ms represents a latency required by the transmit end to process T_Rx>0 ms data, represents a latency required by the receive end to process received data, T_Rx>0 ms represents a latency required to transmit data through an air interface, and T_Bu>0 ms represents a latency required when data at the transmit end waits to be sent in a buffer.

7. The data retransmission method according to claim 5, wherein

Delta_T∈[(T_AI_SR+T_Gap_SR_D), (T_Gap_SR+T_AI_SR+T_Gap_SR_D)], wherein

T_Gap_SR≥0 ms represents a time interval between two adjacent transmission resources for sending scheduling requests;

T_AI_SR>0 ms represents a latency required by the transmit end to send a scheduling request through an air interface; and T_Gap_SR_D≥0 ms represents a time interval between a moment at which the transmit end sends the scheduling request and a moment at which the receive end allocates, to the transmit end, a transmission resource for sending uplink data.

8. A communications apparatus, serving as a data transmit end and comprising:

a processor, configured to start a timer before a transceiver transmits new data to a receive end, wherein a preset value of the timer is a maximum transmission latency corresponding to a service type of the new data, wherein the processor starts the timer when the transceiver transmits the new data; and the transceiver, configured to transmit the new data to the receive end after the processor starts the timer, wherein the processor is further configured to determine whether the timer expires; and the transceiver sends retransmission data to the receive end when the timer does not expire and there is data to be retransmitted, wherein the retransmission data is a part or all of the data; or the transceiver stops sending the retransmission data to the receive end when the timer expires; and, wherein the transceiver stops sending the retransmission data to the receive end when the processor determines that the timer does not expire and a remaining time of the timer is less than a time required by the receive end to receive and process the retransmission data; and when the transceiver requests the receive end to schedule an uplink transmission time-frequency resource to send the new data, the processor is further configured to calculate a maximum transmission quantity based on the following:

N_MAX=Floor((Total_Delay_MAX−Delta_T)/Single_Tx_Delay), wherein

Floor( ) indicates rounding down;

Total_Delay_MAX represents the maximum transmission latency corresponding to the service type of the data;

Delta_T represents a latency for requesting to schedule the uplink transmission time-frequency resource; and Single_Tx_Delay represents a single transmission latency corresponding to the service type of the data.

9. The communications apparatus according to claim 8, wherein the transceiver sends the retransmission data to the receive end when the processor determines that the timer does not expire and the remaining time of the timer is greater than or equal to the time required by the receive end to receive and process the retransmission data.

10. The communications apparatus according to claim 8, wherein the transceiver sends the retransmission data to the receive end when the processor determines that the timer does not expire and a current time of transmission does not exceed the maximum transmission quantity.

11. The communications apparatus according to claim 8, wherein the transceiver stops sending the retransmission data to the receive end when the processor determines that the timer does not expire and a current time of transmission exceeds a maximum transmission quantity.

12. The communications apparatus according to claim 8, comprising:
    memory, configured to store an uplink transmission time-frequency resource pre-allocated by the receive end to the data transmit end, wherein
    when the transceiver sends the data by using the uplink transmission time-frequency resource prestored in the memory, the processor is further configured to calculate a maximum transmission quantity by using the following formula:
    N_MAX=Floor(Total_Delay_MAX/Single_Tx_Delay), wherein
    Floor( ) indicates rounding down;
    Total_Delay_MAX represents the maximum transmission latency corresponding to the service type of the data; and
    Single_Tx_Delay represents the single transmission latency corresponding to the service type of the data.

13. The communications apparatus according to claim 12, wherein
    Single_Tx_Delay∈[(T_Tx+T_AI+T_Rx+T_Bu), (T_Gap+T_Tx+T_AI+T_Rx+T_Bu)], wherein
    T_Gap≥0 ms represents a time interval between two adjacent transmission resources for sending uplink data, T_Tx>0 ms represents a latency required by the processor of the data transmit end to process data, T_Rx>0 ms represents a latency required by the receive end to process received data, T_Rx>0 ms represents a latency required to transmit data through an air interface, and T_Bu>0 ms represents a latency required when data at the data transmit end waits to be sent in a buffer.

14. The communications apparatus according to claim 8, wherein
    Delta_T∈[(T_AI_SR+T_Gap_SR_D), (T_Gap_SR+T_AI_SR+T_Gap_SR_D)], wherein
    T_Gap_SR≥0 ms represents a time interval between two adjacent transmission resources for sending scheduling requests;
    T_AI_SR>0 ms represents a latency required by the transceiver of the data transmit end to send a scheduling request through an air interface; and
    T_Gap_SR_D≥0 ms represents a time interval between a moment at which the transceiver of the data transmit end sends the scheduling request and a moment at which the receive end allocates, to the data transmit end, a transmission resource for sending uplink data.

\* \* \* \* \*